US012655665B2

(12) United States Patent
Rausch et al.

(10) Patent No.: US 12,655,665 B2
(45) Date of Patent: Jun. 16, 2026

(54) VEHICLE DOOR SYSTEMS AND METHOD

(71) Applicant: Oshkosh Corporation, Oshkosh, WI (US)

(72) Inventors: Andrew Rausch, Oshkosh, WI (US); Jon Zeamer, Oshkosh, WI (US); Greg Steffens, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 405 days.

(21) Appl. No.: 18/214,758

(22) Filed: Jun. 27, 2023

(65) Prior Publication Data

US 2023/0417094 A1     Dec. 28, 2023

Related U.S. Application Data

(60) Provisional application No. 63/356,127, filed on Jun. 28, 2022.

(51) Int. Cl.
E05D 3/14          (2006.01)
B60J 5/04          (2006.01)
E05D 15/26         (2006.01)

(52) U.S. Cl.
CPC ............ E05D 3/147 (2013.01); B60J 5/0498 (2013.01); E05D 15/262 (2013.01); *E05Y 2800/102* (2013.01); *E05Y 2900/518* (2013.01); *E05Y 2900/531* (2013.01)

(58) Field of Classification Search
CPC ........ B60J 5/047; B60J 5/0487; B60J 5/0498; E05D 3/147; E05D 15/262; E05Y 2800/102; E05Y 2900/518; E05Y 2900/531
See application file for complete search history.

(56) References Cited

U.S. PATENT DOCUMENTS

| | | | | |
|---|---|---|---|---|
| 3,692,083 A | * | 9/1972 | Swanson ............... | E05D 15/264 |
| | | | | 160/206 |
| 6,279,988 B1 | * | 8/2001 | Muraro .................. | B60J 5/0487 |
| | | | | 160/199 |
| 2020/0290237 A1 | | 9/2020 | Steffens et al. | |

(Continued)

FOREIGN PATENT DOCUMENTS

| | | | | | |
|---|---|---|---|---|---|
| GB | 1084629 A | * | 9/1967 | ............ | B60J 5/0487 |

OTHER PUBLICATIONS

EP 1197367 A2 (Year: 2002).*

*Primary Examiner* — Lori Lyjak
(74) *Attorney, Agent, or Firm* — Foley & Lardner LLP

(57)          ABSTRACT

A refuse vehicle includes a body including a cab, a door assembly, and a linkage assembly. The door assembly is coupled to the cab and includes a first door panel and a second door panel. The first door panel is rotatably coupled to the second door panel and has an unfolded position and a folded position. The linkage assembly is configured to reposition the door assembly between a closed position and an open position relative to the cab. In a first state the door assembly is in the closed position the second door panel is in the unfolded position, and in a second state the door assembly is in the open position and the second door panel is in the folded position. The linkage assembly may include a first linkage coupled between the cab and the door assembly and a second linkage coupled between the cab and the door assembly.

19 Claims, 29 Drawing Sheets

(56)             References Cited

U.S. PATENT DOCUMENTS

| | | | |
|---|---|---|---|
| 2020/0290238 | A1 | 9/2020 | Andringa et al. |
| 2020/0291846 | A1 | 9/2020 | Steffens et al. |
| 2022/0072736 | A1 | 3/2022 | Steffens et al. |
| 2022/0118854 | A1 | 4/2022 | Davis et al. |
| 2023/0150584 | A1 | 5/2023 | Zeamer et al. |
| 2023/0150763 | A1 | 5/2023 | Haberlein et al. |
| 2023/0191887 | A1 | 6/2023 | Rausch et al. |
| 2023/0192401 | A1 | 6/2023 | Zeamer et al. |
| 2023/0211705 | A1 | 7/2023 | Zeamer et al. |
| 2023/0278425 | A1 | 9/2023 | Miller et al. |
| 2023/0278475 | A1 | 9/2023 | Steffens et al. |

* cited by examiner

700

VEHICLE DOOR SYSTEMS AND METHOD

This application claims the benefit of and priority to U.S. Provisional Application No. 63/356,127, filed Jun. 28, 2022, the entire disclosure of which is incorporated by reference herein.

BACKGROUND

The present disclosure relates generally to vehicles. More specifically, the present disclosure relates to a door that is pivotably coupled to the vehicle by a linkage assembly.

SUMMARY

One embodiment relates to a refuse vehicle. The refuse vehicle includes a chassis, a body coupled to the chassis and including a cab, a door assembly, and a linkage assembly. The door assembly is coupled to the cab and includes a first door panel and a second door panel. The first door panel is rotatably coupled to the second door pane, such that the door assembly has a unfolded position and a folded position. The linkage assembly couples the door assembly to the cab and is configured to rotate the door assembly between a closed position and an open position relative to the cab. In a first state the door assembly is in the closed position the second door panel is in the unfolded position, and in a second state the door assembly is in the open position and the second door panel is in the folded position.

Another embodiment relates to a door of a refuse vehicle. The door includes a door assembly, a bracket, and a linkage assembly. The door assembly includes a first door panel and a second door panel. The second door panel is rotatably coupled to the first door panel between an unfolded position and a folded position about a first axis. The bracket is rotatably couple to the door assembly by the linkage assembly. The linkage assembly rotates the door relative to the bracket about a second axis. The linkage assembly includes a first linkage rotatably coupled to the door assembly and the bracket, the first linkage having a first length. The linkage assembly also includes a second linkage rotatably coupled to the door assembly and the bracket, the second linkage having a second length, wherein the first length is greater than the second length.

Another embodiment relates to a refuse vehicle. The refuse vehicle includes a chassis, a body coupled to the chassis and including a cab, a door assembly, and a linkage assembly. The door assembly includes a first door panel and a second door panel. The second door panel is rotatably coupled to the first door panel about a first axis and has an unfolded position and a folded position. The linkage couples the door assembly to the cab and is configured to rotate the door assembly between a closed position, an intermediate position, and an open position relative to the cab about a second axis. The first axis substantially perpendicular to the second axis. In a first state the door assembly is in the closed position the second door panel is in the unfolded position, and in a second state the door assembly is in the open position and the second door panel is in the folded position. The second door assembly rotates from the unfolded position to the folded position when the door assembly is in the intermediate position.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle includes a chassis, a body coupled to the chassis and including a cab, a door assembly, and a linkage assembly. The door assembly is coupled to the cab and includes a first door panel and a second door panel. The first door panel is pivotably coupled to the second door panel. The linkage assembly is coupled to the door assembly proximate the first door panel. The linkage assembly is configured to reposition the door assembly between a closed position, an intermediate position, and an open position. The linkage assembly includes a linkage bracket coupled to the cab, a first linkage coupled between the linkage bracket and the first door panel at a first distance, and a second linkage coupled between the linkage bracket and the first door panel at a second distance. The second door panel pivots between an unfolded position and a folded position when the door assembly is in the intermediate position.

In some embodiments, the first linkage includes a first axis of rotation provided proximate the linkage bracket and a second axis of rotation provided proximate the first door panel. The second linkage includes a second axis of rotation provided proximate the linkage bracket and a fourth axis of rotation provided proximate the first door panel. The first axis of rotation, second axis of rotation, third axis of rotation, and fourth axis of rotation are provided parallel to one another.

Overall Vehicle

Figure 1:
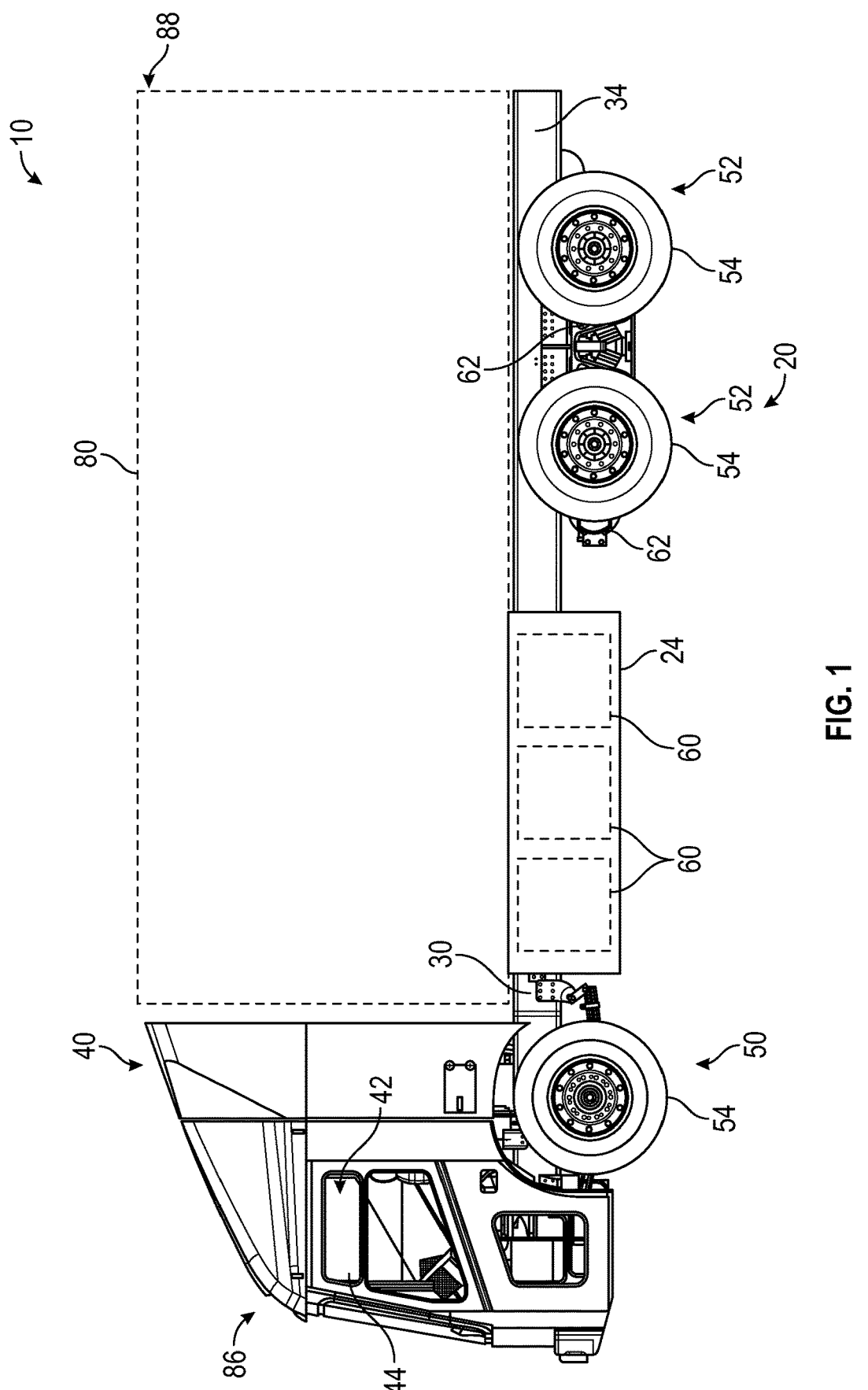
FIG. 1 is a left side view of a vehicle, according to an exemplary embodiment.
Figure 2:
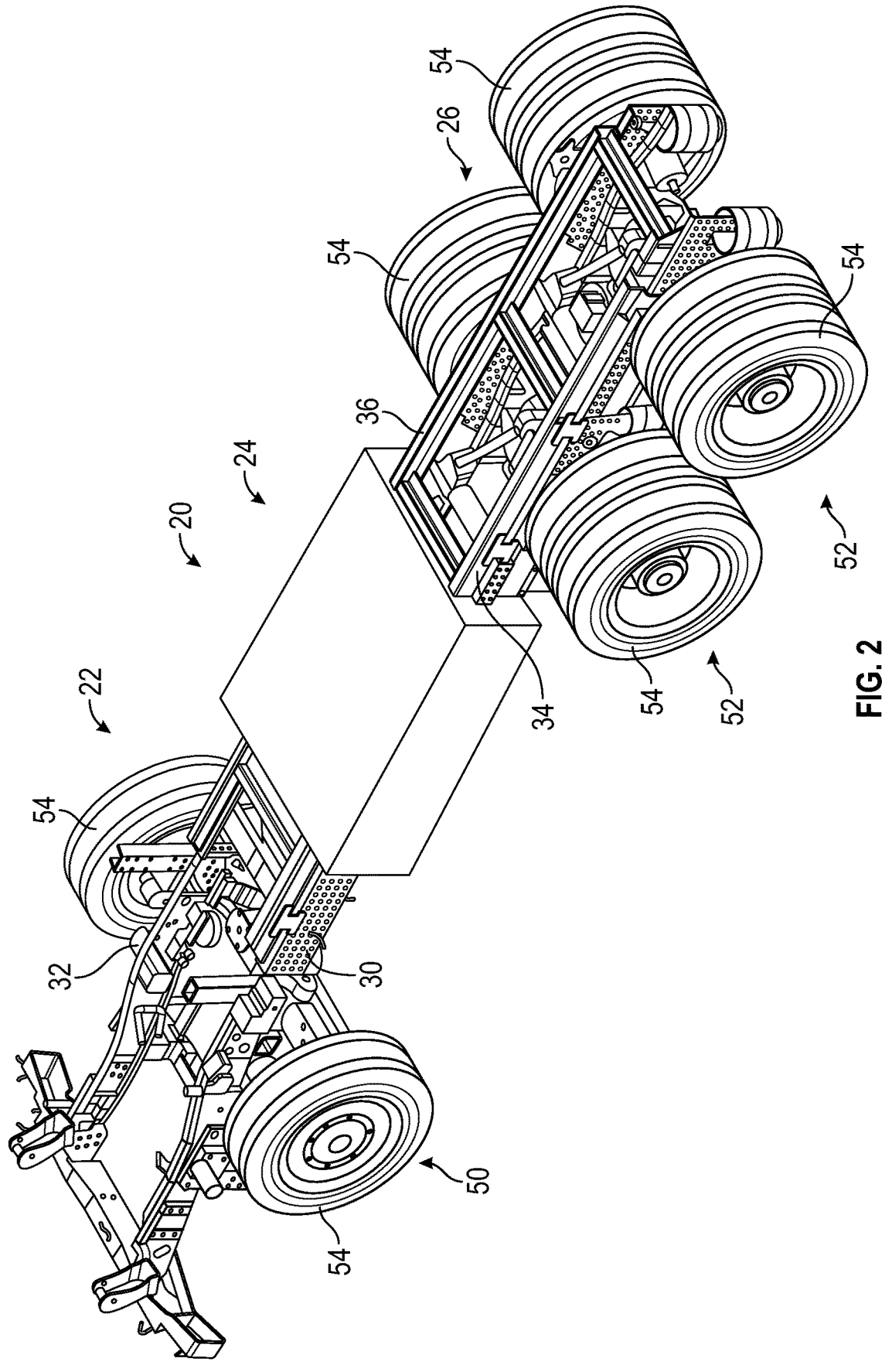
FIG. 2 is a perspective view of a chassis of the vehicle of FIG. 1.

Referring to FIGS. 1 and 2, a reconfigurable vehicle (e.g., a vehicle assembly, a truck, a vehicle base, etc.) is shown as vehicle 10, according to an exemplary embodiment. As shown, the vehicle 10 includes a frame assembly or chassis assembly, shown as chassis 20, that supports other components of the vehicle 10. The chassis 20 extends longitudinally along a length of the vehicle 10, substantially parallel to a primary direction of travel of the vehicle 10. As shown, the chassis 20 includes three sections or portions, shown as front section 22, middle section 24, and rear section 26. The middle section 24 of the chassis 20 extends between the front section 22 and the rear section 26. In some embodiments, the middle section 24 of the chassis 20 couples the front section 22 to the rear section 26. In other embodiments, the front section 22 is coupled to the rear section 26 by another component (e.g., the body of the vehicle 10).

As shown in FIG. 2, the front section 22 includes a pair of frame portions, frame members, or frame rails, shown as front rail portion 30 and front rail portion 32. The rear section 26 includes a pair of frame portions, frame members, or frame rails, shown as rear rail portion 34 and rear rail portion 36. The front rail portion 30 is laterally offset from the front rail portion 32. Similarly, the rear rail portion 34 is laterally offset from the rear rail portion 36. This spacing may provide frame stiffness and space for vehicle components (e.g., batteries, motors, axles, gears, etc.) between the frame rails. In some embodiments, the front rail portions 30 and 32 and the rear rail portions 34 and 36 extend longitudinally and substantially parallel to one another. The chassis 20 may include additional structural elements (e.g., cross members that extend between and couple the frame rails).

In some embodiments, the front section 22 and the rear section 26 are configured as separate, discrete subframes (e.g., a front subframe and a rear subframe). In such embodiments, the front rail portion 30, the front rail portion 32, the rear rail portion 34, and the rear rail portion 36 are separate, discrete frame rails that are spaced apart from one another. In some embodiments, the front section 22 and the rear section 26 are each directly coupled to the middle section 24 such that the middle section 24 couples the front section 22 to the rear section 26. Accordingly, the middle section 24 may include a structural housing or frame. In other embodiments, the front section 22, the middle section 24, and the rear section 26 are coupled to one another by another component, such as a body of the vehicle 10.

In other embodiments, the front section 22, the middle section 24, and the rear section 26 are defined by a pair of frame rails that extend continuously along the entire length of the vehicle 10. In such an embodiment, the front rail portion 30 and the rear rail portion 34 would be front and rear portions of a first frame rail, and the front rail portion 32 and the rear rail portion 36 would be front and rear portions of a second frame rail. In such embodiments, the middle section 24 would include a center portion of each frame rail.

In some embodiments, the middle section 24 acts as a storage portion that includes one or more vehicle components. The middle section 24 may include an enclosure that contains one or more vehicle components and/or a frame that supports one or more vehicle components. By way of example, the middle section 24 may contain or include one or more electrical energy storage devices (e.g., batteries, capacitors, etc.). By way of another example, the middle section 24 may include fuel tanks fuel tanks. By way of yet another example, the middle section 24 may define a void space or storage volume that can be filled by a user.

A cabin, operator compartment, or body component, shown as cab 40, is coupled to a front end portion of the chassis 20 (e.g., the front section 22 of the chassis 20). Together, the chassis 20 and the cab 40 define a front end of the vehicle 10. The cab 40 extends above the chassis 20. The cab 40 includes an enclosure or main body that defines an interior volume, shown as cab interior 42, that is sized to contain one or more operators. The cab 40 also includes one or more doors 44 that facilitate selective access to the cab interior 42 from outside of the vehicle 10. The cab interior 42 contains one or more components that facilitate operation of the vehicle 10 by the operator. By way of example, the cab interior 42 may contain components that facilitate operator comfort (e.g., seats, seatbelts, etc.), user interface components that receive inputs from the operators (e.g., steering wheels, pedals, touch screens, switches, buttons, levers, etc.), and/or user interface components that provide information to the operators (e.g., lights, gauges, speakers, etc.). The user interface components within the cab 40 may facilitate operator control over the drive components of the vehicle 10 and/or over any implements of the vehicle 10.

The vehicle 10 further includes a series of axle assemblies, shown as front axle 50 and rear axles 52. As shown, the vehicle 10 includes one front axle 50 coupled to the front section 22 of the chassis 20 and two rear axles 52 each coupled to the rear section 26 of the chassis 20. In other embodiments, the vehicle 10 includes more or fewer axles. By way of example, the vehicle 10 may include a tag axle that may be raised or lowered to accommodate variations in weight being carried by the vehicle 10. The front axle 50 and the rear axles 52 each include a series of tractive elements (e.g., wheels, treads, etc.), shown as wheel and tire assemblies 54. The wheel and tire assemblies 54 are configured to engage a support surface (e.g., roads, the ground, etc.) to support and propel the vehicle 10. The front axle 50 and the rear axles may include steering components (e.g., steering arms, steering actuators, etc.), suspension components (e.g., gas springs, dampeners, air springs, etc.), power transmission or drive components (e.g., differentials, drive shafts, etc.), braking components (e.g., brake actuators, brake pads, brake discs, brake drums, etc.), and/or other components that facilitate propulsion or support of the vehicle.

In some embodiments, the vehicle 10 is configured as an electric vehicle that is propelled by an electric powertrain system. Referring to FIG. 1, the vehicle 10 includes one or more electrical energy storage devices (e.g., batteries, capacitors, etc.), shown as batteries 60. As shown, the batteries 60 are positioned within the middle section 24 of the chassis 20. In other embodiments, the batteries 60 are otherwise positioned throughout the vehicle 10. The vehicle 10 further includes one or more electromagnetic devices or prime movers (e.g., motor/generators), shown as drive motors 62. The drive motors 62 are electrically coupled to the batteries 60. The drive motors 62 may be configured to receive electrical energy from the batteries 60 and provide rotational mechanical energy to the wheel and tire assemblies 54 to propel the vehicle 10. The drive motors 62 may be configured to receive rotational mechanical energy from the wheel and tire assemblies 64 and provide electrical energy to the batteries 60, providing a braking force to slow the vehicle 10.

The batteries 60 may include one or more rechargeable batteries (e.g., lithium-ion batteries, nickel-metal hydride batteries, lithium-ion polymer batteries, lead-acid batteries, nickel-cadmium batteries, etc.). The batteries 60 may be charged by one or more sources of electrical energy onboard the vehicle 10 (e.g., solar panels, etc.) or separate from the vehicle 10 (e.g., connections to an electrical power grid, a wireless charging system, etc.). As shown, the drive motors 62 are positioned within the rear axles 52 (e.g., as part of a combined axle and motor assembly). In other embodiments, the drive motors 62 are otherwise positioned within the vehicle 10.

In other embodiments, the vehicle 10 is configured as a hybrid vehicle that is propelled by a hybrid powertrain system (e.g., a diesel/electric hybrid, gasoline/electric hybrid, natural gas/electric hybrid, etc.). According to an exemplary embodiment, the hybrid powertrain system may include a primary driver (e.g., an engine, a motor, etc.), an energy generation device (e.g., a generator, etc.), and/or an energy storage device (e.g., a battery, capacitors, ultracapacitors, etc.) electrically coupled to the energy generation device. The primary driver may combust fuel (e.g., gasoline, diesel, etc.) to provide mechanical energy, which a transmission may receive and provide to the axle front axle 50 and/or the rear axles 52 to propel the vehicle 10. Additionally or alternatively, the primary driver may provide mechanical energy to the generator, which converts the mechanical energy into electrical energy. The electrical energy may be stored in the energy storage device (e.g., the batteries 60) in order to later be provided to a motive driver.

In yet other embodiments, the chassis 20 may further be configured to support non-hybrid powertrains. For example, the powertrain system may include a primary driver that is a compression-ignition internal combustion engine that utilizes diesel fuel.

Referring to FIG. 1, the vehicle 10 includes a rear assembly, module, implement, body, or cargo area, shown as application kit 80. The application kit 80 may include one or more implements, vehicle bodies, and/or other components. Although the application kit 80 is shown positioned behind the cab 40, in other embodiments the application kit 80 extends forward of the cab 40. The vehicle 10 may be outfitted with a variety of different application kits 80 to configure the vehicle 10 for use in different applications. Accordingly, a common vehicle 10 can be configured for a variety of different uses simply by selecting an appropriate application kit 80. By way of example, the vehicle 10 may be configured as a refuse vehicle, a concrete mixer, a fire fighting vehicle, an airport fire fighting vehicle, a lift device (e.g., a boom lift, a scissor lift, a telehandler, a vertical lift, etc.), a crane, a tow truck, a military vehicle, a delivery vehicle, a mail vehicle, a boom truck, a plow truck, a farming machine or vehicle, a construction machine or vehicle, a coach bus, a school bus, a semi-truck, a passenger or work vehicle (e.g., a sedan, a SUV, a truck, a van, etc.), and/or still another vehicle. FIGS. 3-13 illustrate various examples of how the vehicle 10 may be configured for specific applications. Although only a certain set of vehicle configurations is shown, it should be understood that the vehicle 10 may be configured for use in other applications that are not shown.

The application kit 80 may include various actuators to facilitate certain functions of the vehicle 10. By way of example, the application kit 80 may include hydraulic actuators (e.g., hydraulic cylinders, hydraulic motors, etc.), pneumatic actuators (e.g., pneumatic cylinders, pneumatic motors, etc.), and/or electrical actuators (e.g., electric motors, electric linear actuators, etc.). The application kit 80 may include components that facilitate operation of and/or control of these actuators. By way of example, the application kit 80 may include hydraulic or pneumatic components that form a hydraulic or pneumatic circuit (e.g., conduits, valves, pumps, compressors, gauges, reservoirs, accumulators, etc.). By way of another example, the application kit 80 may include electrical components (e.g., batteries, capacitors, voltage regulators, motor controllers, etc.). The actuators may be powered by components of the vehicle By way of example, the actuators may be powered by the batteries 60, the drive motors 62, or the primary driver (e.g., through a power take off).

The vehicle 10 generally extends longitudinally from a front side 86 to a rear side 88. The front side 86 is defined by the cab 40 and/or the chassis. The rear side 88 is defined by the application kit 80 and/or the chassis 20. The primary, forward direction of travel of the vehicle is longitudinal, with the front side 86 being arranged forward of the rear side 88.

A. Front-Loading Refuse Vehicle

Figure 3:
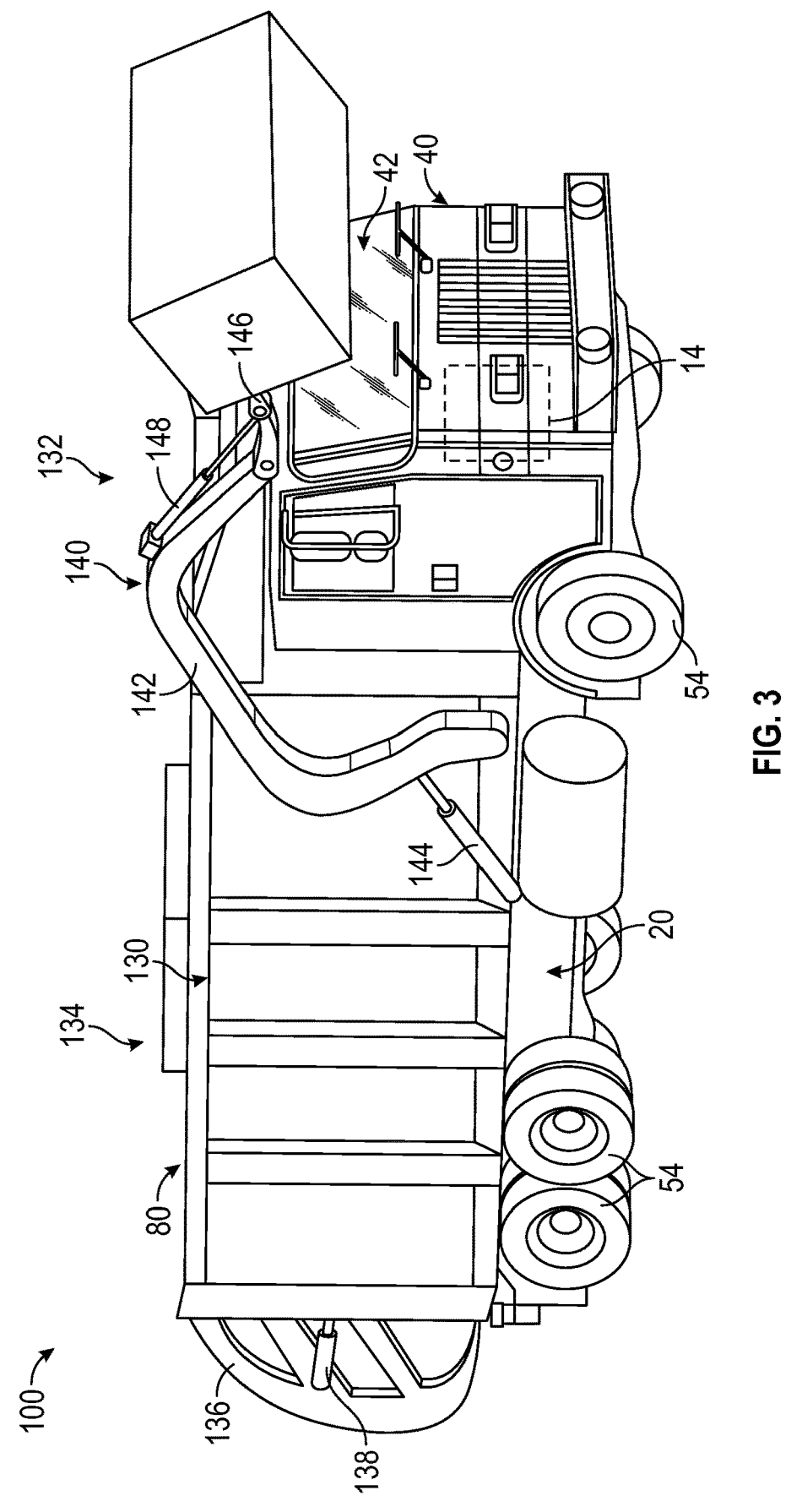
FIG. 3 is a perspective view of the vehicle of FIG. 1 configured as a front-loading refuse vehicle, according to an exemplary embodiment.
Figure 4:
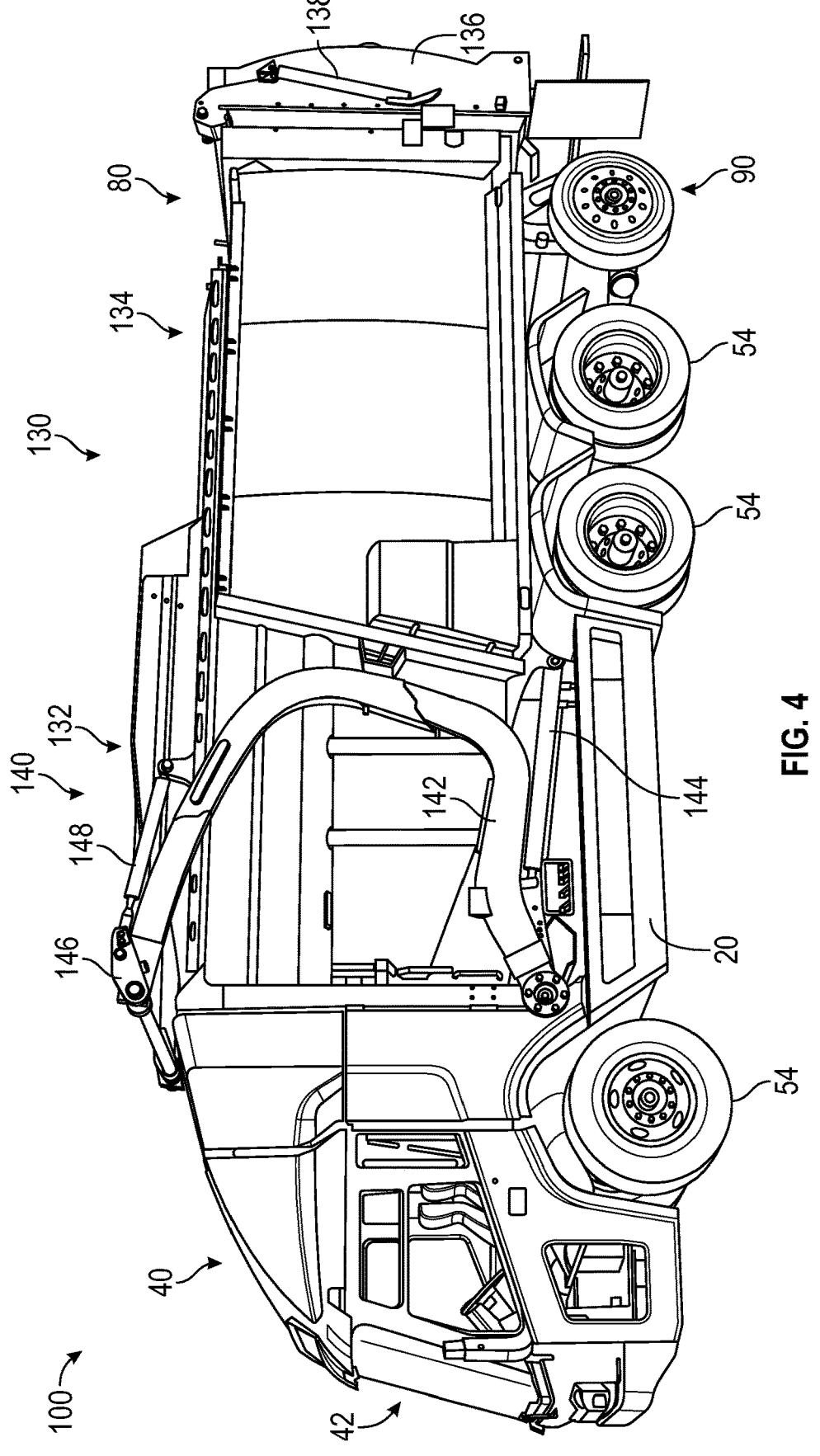
FIG. 4 is a left side view of the front-loading refuse vehicle of FIG. 3 configured with a tag axle.

Referring now to FIGS. 3 and 4, the vehicle 10 is configured as a refuse vehicle 100 (e.g., a refuse truck, a garbage truck, a waste collection truck, a sanitation truck, a recycling truck, etc.). Specifically, the refuse vehicle 100 is a front-loading refuse vehicle. In other embodiments, the refuse vehicle 100 is configured as a rear-loading refuse vehicle or a front-loading refuse vehicle. The refuse vehicle 100 may be configured to transport refuse from various waste receptacles (e.g., refuse containers) within a municipality to a storage and/or processing facility (e.g., a landfill, an incineration facility, a recycling facility, etc.).

FIG. 4 illustrates the refuse vehicle 100 of FIG. 3 configured with a liftable axle, shown as tag axle 90, including a pair of wheel and tire assemblies 54. As shown, the tag axle 90 is positioned reward of the rear axles 52. The tag axle 90 can be selectively raised and lowered (e.g., by a hydraulic actuator) to selectively engage the wheel and tire assemblies 54 of the tag axle 90 with the ground. The tag axle 90 may be raised to reduce rolling resistance experienced by the refuse vehicle 100. The tag axle 90 may be lowered to distribute the loaded weight of the vehicle 100 across a greater number of a wheel and tire assemblies 54 (e.g., when the refuse vehicle 100 is loaded with refuse).

As shown in FIGS. 3 and 4, the application kit 80 of the refuse vehicle 100 includes a series of panels that form a rear body or container, shown as refuse compartment 130. The refuse compartment 130 may facilitate transporting refuse from various waste receptacles within a municipality to a storage and/or a processing facility (e.g., a landfill, an incineration facility, a recycling facility, etc.). By way of example, loose refuse may be placed into the refuse compartment 130 where it may be compacted (e.g., by a packer system within the refuse compartment 130). The refuse compartment 130 may also provide temporary storage for refuse during transport to a waste disposal site and/or a recycling facility. In some embodiments, the refuse compartment 130 may define a hopper volume 132 and storage volume 134. In this regard, refuse may be initially loaded into the hopper volume 132 and later compacted into the storage volume 134. As shown, the hopper volume 132 is positioned between the storage volume 134 and the cab 40 (e.g., refuse is loaded into a portion of the refuse compartment 130 behind the cab 40 and stored in a portion further toward the rear of the refuse compartment 130). In other embodiments, the storage volume may be positioned between the hopper volume and the cab 40 (e.g., in a rear-loading refuse truck, etc.). The application kit 80 of the refuse vehicle 100 further includes a pivotable rear portion, shown as tailgate 136, that is pivotally coupled to the refuse compartment 130. The tailgate 136 may be selectively repositionable between a closed position and an open position by an actuator (e.g., a hydraulic cylinder, an electric linear actuator, etc.), shown as tailgate actuator 138 (e.g., to facilitate emptying the storage volume).

As shown in FIGS. 3 and 4, the refuse vehicle 100 also includes an implement, shown as lift assembly 140, which is a front-loading lift assembly. According to an exemplary embodiment, the lift assembly 140 includes a pair of lift arms 142 and a pair of actuators (e.g., hydraulic cylinders, electric linear actuators, etc.), shown as lift arm actuators 144. The lift arms 142 may be rotatably coupled to the chassis 20 and/or the refuse compartment 130 on each side of the refuse vehicle 100 (e.g., through a pivot, a lug, a shaft, etc.), such that the lift assembly 140 may extend forward relative to the cab 40 (e.g., a front-loading refuse truck, etc.). In other embodiments, the lift assembly 140 may extend rearward relative to the application kit 80 (e.g., a rear-loading refuse truck). As shown in FIGS. 3 and 4, in an exemplary embodiment the lift arm actuators 144 may be positioned such that extension and retraction of the lift arm actuators 144 rotates the lift arms 142 about an axis extending through the pivot. In this regard, the lift arms 142 may be rotated by the lift arm actuators 144 to lift a refuse container over the cab 40. The lift assembly 140 further includes a pair of interface members, shown as lift forks 146, each pivotally coupled to a distal end of one of the lift arms 142. The lift forks 146 may be configured to engage a refuse container (e.g., a dumpster) to selectively coupled the refuse container to the lift arms 142. By way of example, each of the lift forks 146 may be received within a corresponding pocket defined by the refuse container. A pair of actuators (e.g., hydraulic cylinders, electric linear actuators, etc.), shown as articulation actuators 148, are each coupled to one of the lift arms 142 and one of the lift forks 146. The articulation actuators 148 may be positioned to rotate the lift forks 146 relative to the lift arms 142 about a horizontal axis. Accordingly, the articulation actuators 148 may assist in tipping refuse out of the refuse container and into the refuse compartment 130. The lift arm actuators 144 may then rotate the lift arms 142 to return the empty refuse container to the ground.

B. Side-Loading Refuse Vehicle

Figure 5:
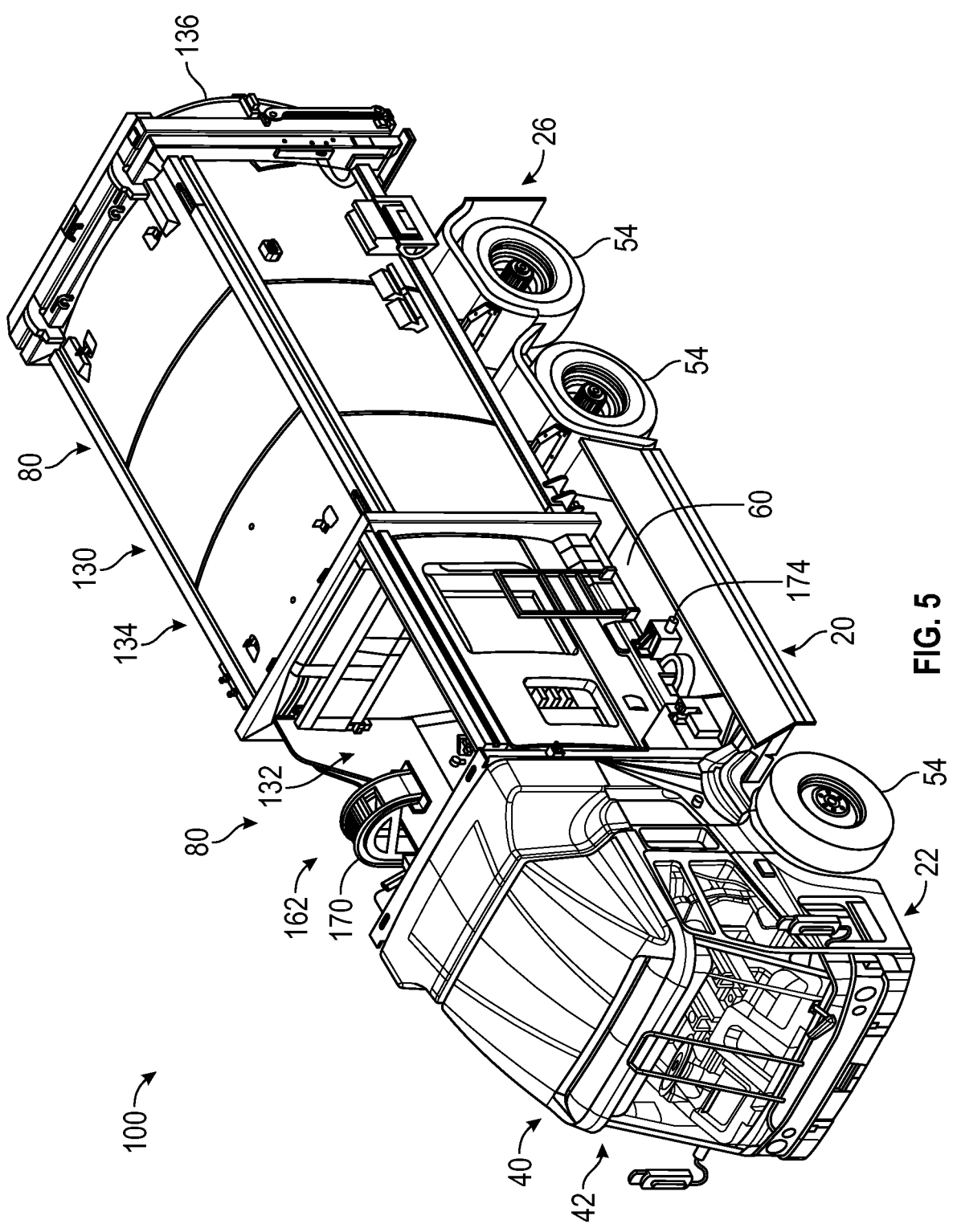
FIG. 5 is a perspective view of the vehicle of FIG. 1 configured as a side-loading refuse vehicle, according to an exemplary embodiment.
Figure 6:
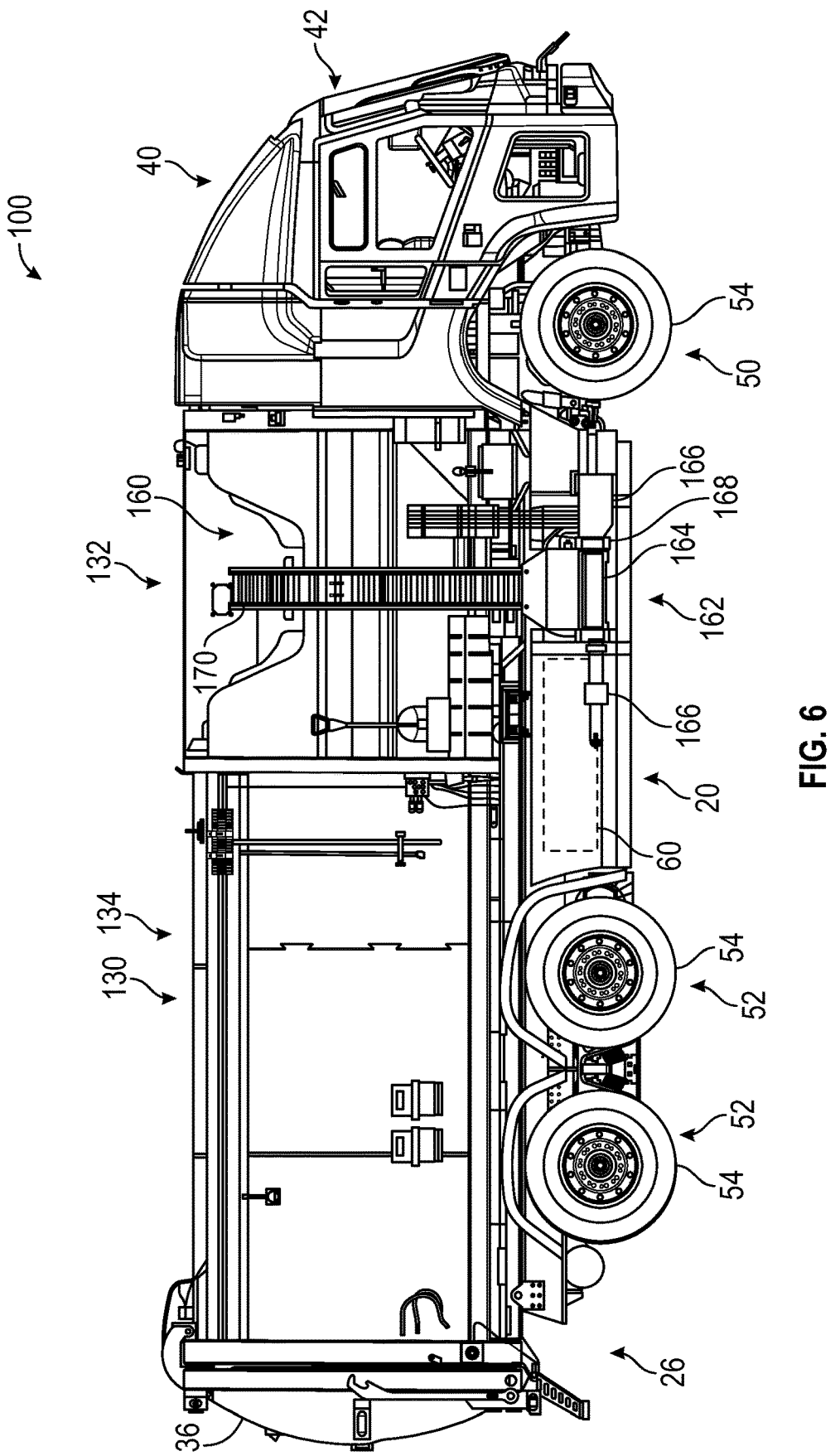
FIG. 6 is a right side view of the side-loading refuse vehicle of FIG. 5.
Figure 7:
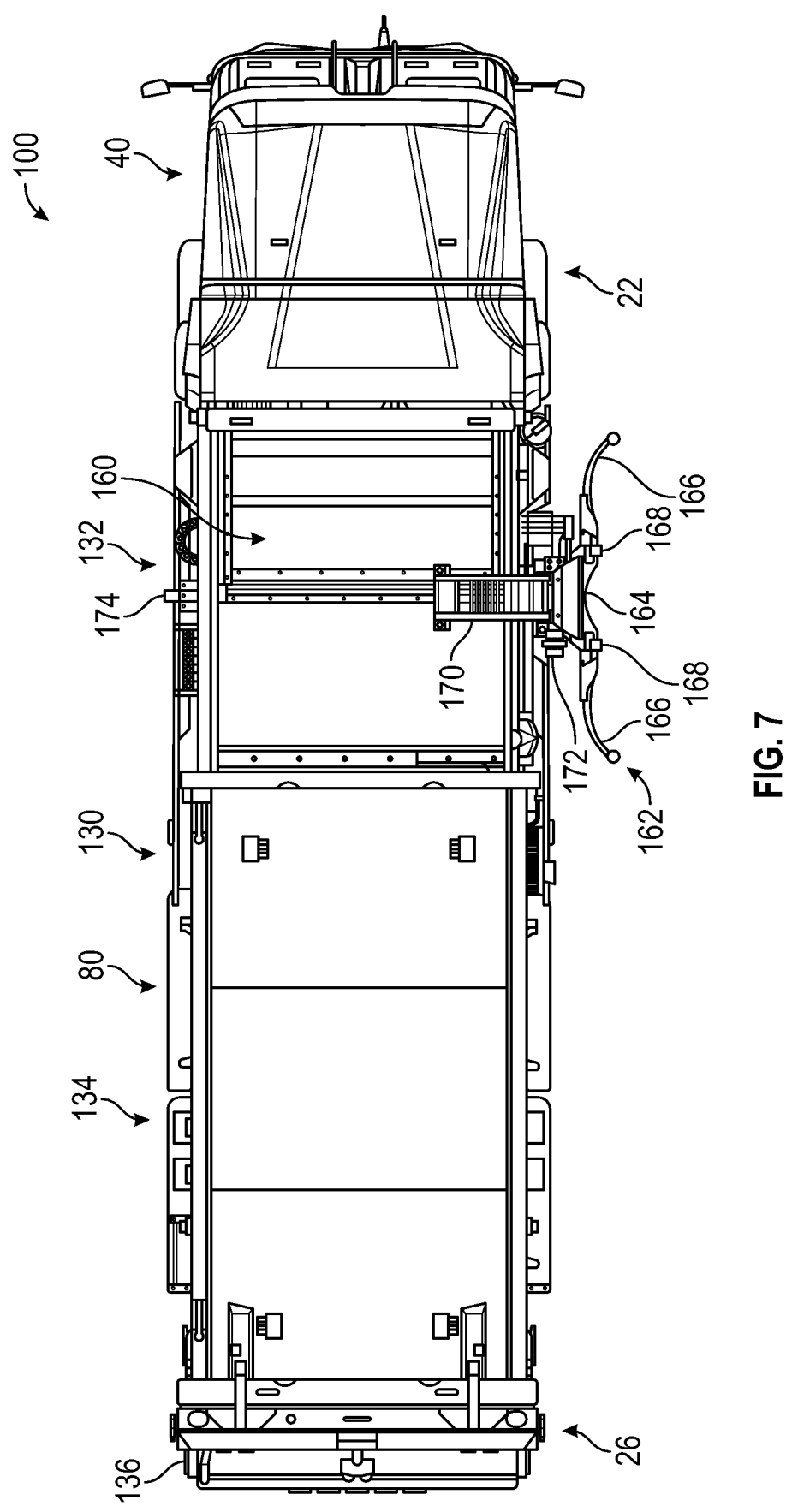
FIG. 7 is a top view of the side-loading refuse vehicle of FIG. 5.
Figure 8:
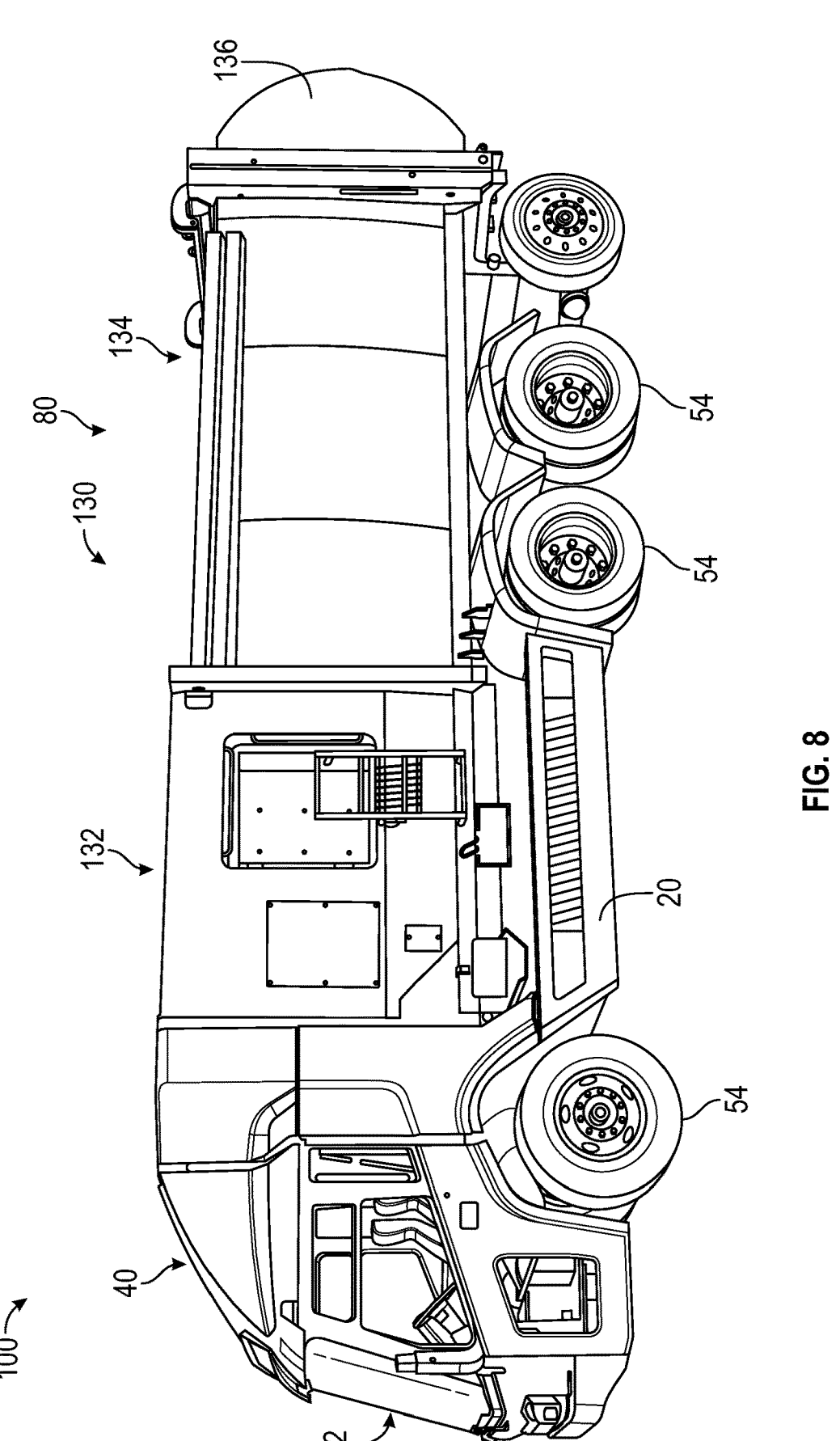
FIG. 8 is a left side view of the side-loading refuse vehicle of FIG. 5 configured with a tag axle.

Referring now to FIGS. 5-8, an alternative configuration of the refuse vehicle 100 is shown according to an exemplary embodiment. Specifically, the refuse vehicle 100 of FIGS. 5-8 is configured as a side-loading refuse vehicle. The refuse vehicle 100 of FIGS. 5-8 may be substantially similar to the front-loading refuse vehicle 100 of FIGS. 3 and 4 except as otherwise specified herein. As shown, the refuse vehicle 100 of FIGS. 5-7 is configured with a tag axle 90 in FIG. 8.

Referring still to FIGS. 5-8, the refuse vehicle 100 omits the lift assembly 140 and instead includes a side-loading lift assembly, shown as lift assembly 160, that extends laterally outward from a side of the refuse vehicle 100. The lift assembly 160 includes an interface assembly, shown as grabber assembly 162, that is configured to engage a refuse container (e.g., a residential garbage can) to selectively couple the refuse container to the lift assembly 160. The grabber assembly 162 includes a main portion, shown as main body 164, and a pair of fingers or interface members, shown as grabber fingers 166. The grabber fingers 166 are pivotally coupled to the main body 164 such that the grabber fingers 166 are each rotatable about a vertical axis. A pair of actuators (e.g., hydraulic motors, electric motors, etc.), shown as finger actuators 168, are configured to control movement of the grabber fingers 166 relative to the main body 164.

The grabber assembly 162 is movably coupled to a guide, shown as track 170, that extends vertically along a side of the refuse vehicle 100. Specifically, the main body 164 is slidably coupled to the track 170 such that the main body 164 is repositionable along a length of the track 170. An actuator (e.g., a hydraulic motor, an electric motor, etc.), shown as lift actuator 172, is configured to control movement of the grabber assembly 162 along the length of the track 170. In some embodiments, a bottom end portion of the track 170 is straight and substantially vertical such that the grabber assembly 162 raises or lowers a refuse container when moving along the bottom end portion of the track 170. In some embodiments, a top end portion of the track 170 is curved such that the grabber assembly 162 inverts a refuse container to dump refuse into the hopper volume 132 when moving along the top end portion of the track 170.

The lift assembly 160 further includes an actuator (e.g., a hydraulic cylinder, an electric linear actuator, etc.), shown as track actuator 174, that is configured to control lateral movement of the grabber assembly 162. By way of example, the track actuator 174 may be coupled to the chassis 20 and the track 170 such that the track actuator 174 moves the track 170 and the grabber assembly 162 laterally relative to the chassis 20. The track actuator 174 may facilitate repositioning the grabber assembly 162 to pick up and replace refuse containers that are spaced laterally outward from the refuse vehicle 100.

C. Concrete Mixer Truck

Figure 9:
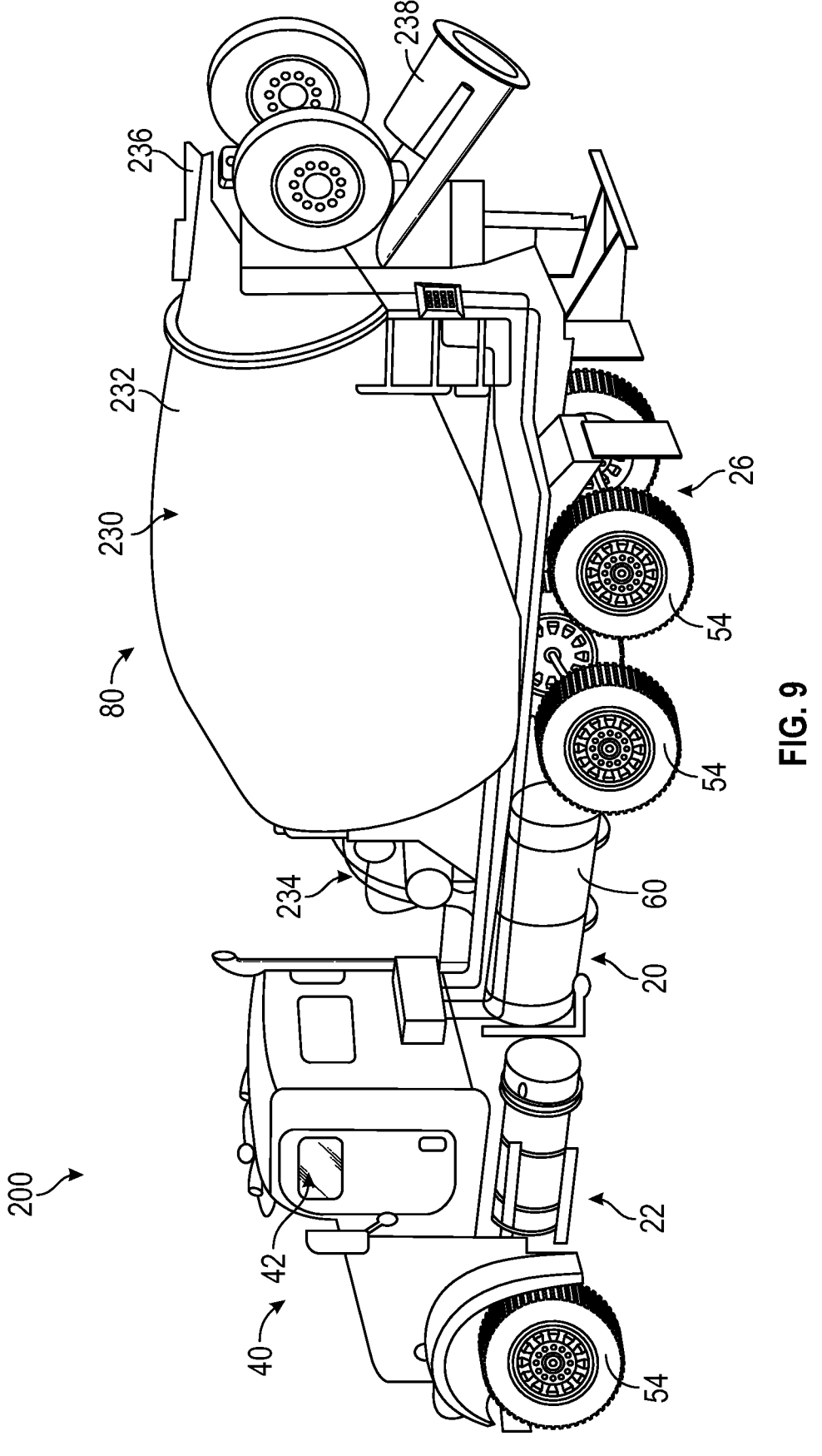
FIG. 9 is a perspective view of the vehicle of FIG. 1 configured as a mixer vehicle, according to an exemplary embodiment.

Referring now to FIG. 9, the vehicle 10 is configured as a mixer truck (e.g., a concrete mixer truck, a mixer vehicle, etc.), shown as mixer truck 200. Specifically, the mixer truck 200 is shown as a rear-discharge concrete mixer truck. In other embodiments, the mixer truck 200 is a front-discharge concrete mixer truck.

As shown in FIG. 9, the application kit 80 includes a mixing drum assembly (e.g., a concrete mixing drum), shown as drum assembly 230. The drum assembly 230 may include a mixing drum 232, a drum drive system 234 (e.g., a rotational actuator or motor, such as an electric motor or hydraulic motor), an inlet portion, shown as hopper 236, and an outlet portion, shown as chute 238. The mixing drum 232 may be coupled to the chassis 20 and may be disposed behind the cab 40 (e.g., at the rear and/or middle of the chassis 20). In an exemplary embodiment, the drum drive system 234 is coupled to the chassis 20 and configured to selectively rotate the mixing drum 232 about a central, longitudinal axis. According to an exemplary embodiment, the central, longitudinal axis of the mixing drum 232 may be elevated from the chassis 20 (e.g., from a horizontal plane extending along the chassis 20) at an angle in the range of five degrees to twenty degrees. In other embodiments, the central, longitudinal axis may be elevated by less than five degrees (e.g., four degrees, etc.). In yet another embodiment, the mixer truck 200 may include an actuator positioned to facilitate adjusting the central, longitudinal axis to a desired or target angle (e.g., manually in response to an operator input/command, automatically according to a control system, etc.).

The mixing drum 232 may be configured to receive a mixture, such as a concrete mixture (e.g., cementitious material, aggregate, sand, etc.), through the hopper 236. In some embodiments, the mixer truck 200 includes an injection system (e.g., a series of nozzles, hoses, and/or valves) including an injection valve that selectively fluidly couples a supply of fluid to the inner volume of the mixing drum 232. By way of example, the injection system may be used to inject water and/or chemicals (e.g., air entrainers, water reducers, set retarders, set accelerators, superplasticizers, corrosion inhibitors, coloring, calcium chloride, minerals, and/or other concrete additives, etc.) into the mixing drum 232. The injection valve may facilitate injecting water and/or chemicals from a fluid reservoir (e.g., a water tank, etc.) into the mixing drum 232, while preventing the mixture in the mixing drum 232 from exiting the mixing drum 232 through the injection system. In some embodiments, one or more mixing elements (e.g., fins, etc.) may be positioned in the interior of the mixing drum 232, and may be configured to agitate the contents of the mixture when the mixing drum 232 is rotated in a first direction (e.g., counterclockwise, clockwise, etc.), and drive the mixture out through the chute 238 when the mixing drum 232 is rotated in a second direction (e.g., clockwise, counterclockwise, etc.). In some embodiments, the chute 238 may also include an actuator positioned such that the chute 238 may be selectively pivotable to position the chute 238 (e.g., vertically, laterally, etc.), for example at an angle at which the mixture is expelled from the mixing drum 232.

D. Fire Truck

Figure 10:
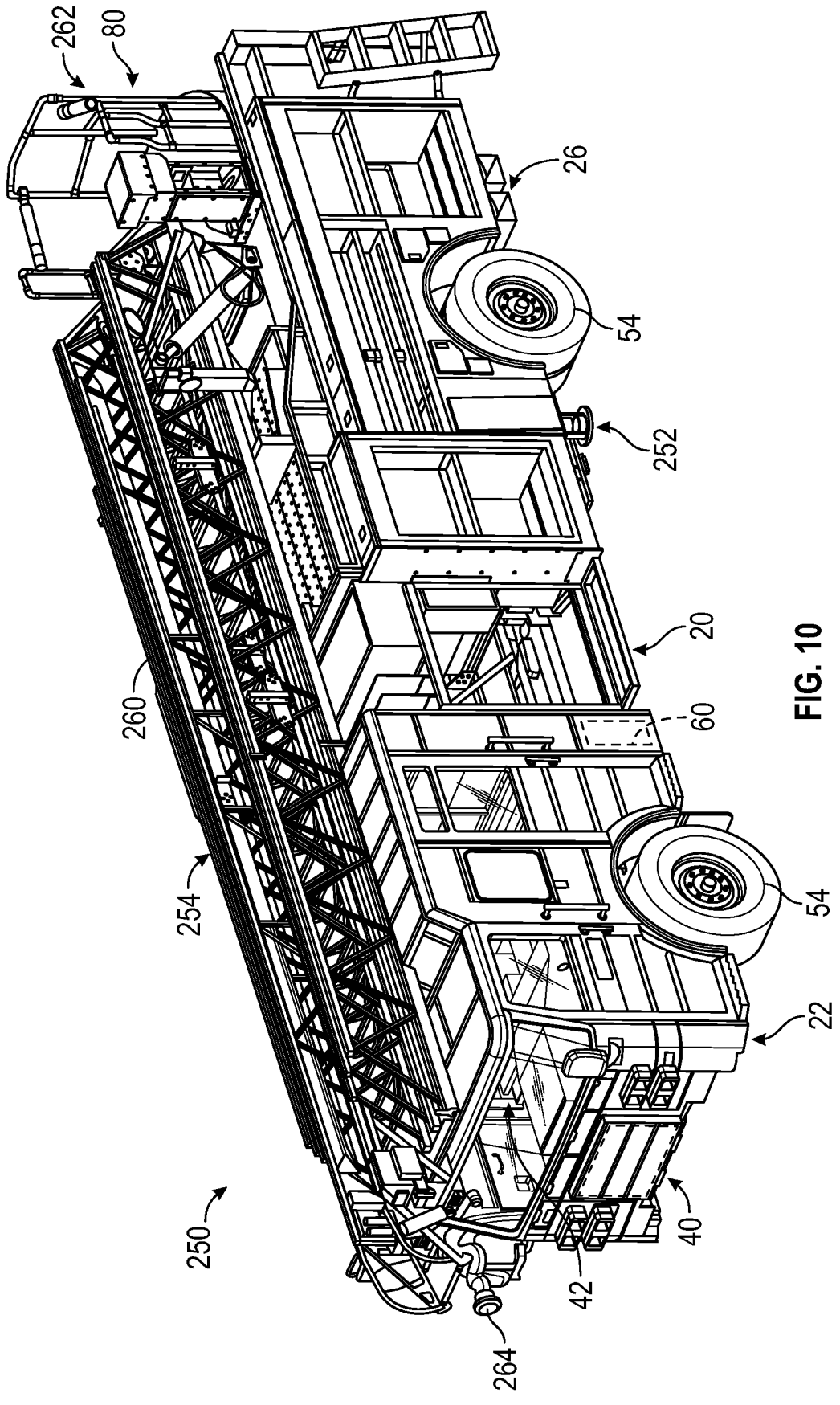
FIG. 10 is a perspective view of the vehicle of FIG. 1 configured as a fire fighting vehicle, according to an exemplary embodiment.

Referring now to FIG. 10, the vehicle 10 is configured as a fire fighting vehicle, fire truck, or fire apparatus (e.g., a turntable ladder truck, a pumper truck, a quint, etc.), shown as fire fighting vehicle 250. In the embodiment shown in FIG. 10, the fire fighting vehicle 250 is configured as a rear-mount aerial ladder truck. In other embodiments, the fire fighting vehicle 250 is configured as a mid-mount aerial ladder truck, a quint fire truck (e.g., including an onboard water storage, a hose storage, a water pump, etc.), a tiller fire truck, a pumper truck (e.g., without an aerial ladder), or another type of response vehicle. By way of example, the vehicle 10 may be configured as a police vehicle, an ambulance, a tow truck, or still other vehicles used for responding to a scene (e.g., an accident, a fire, an incident, etc.).

As shown in FIG. 10, in the fire fighting vehicle 250, the application kit 80 is positioned mainly rearward from the cab 40. The application kit 80 includes deployable stabilizers (e.g., outriggers, downriggers, etc.), shown as outriggers 252, that are coupled to the chassis 20. The outriggers 252 may be configured to selectively extend from each lateral side and/or the rear of the fire fighting vehicle 250 and engage a support surface (e.g., the ground) in order to provide increased stability while the fire fighting vehicle 250 is stationary. The fire fighting vehicle 250 further includes an extendable or telescoping ladder assembly, shown as ladder assembly 254. The increased stability provided by the outriggers 252 is desirable when the ladder assembly 254 is in use (e.g., extended from the fire fighting vehicle 250) to prevent tipping. In some embodiments, the application kit 80 further includes various storage compartments (e.g., cabinets, lockers, etc.) that may be selectively opened and/or accessed for storage and/or component inspection, maintenance, and/or replacement.

As shown in FIG. 10, the ladder assembly 254 includes a series of ladder sections 260 that are slidably coupled with one another such that the ladder sections 260 may extend and/or retract (e.g., telescope) relative to one another to selectively vary a length of the ladder assembly 254. A base platform, shown as turntable 262, is rotatably coupled to the chassis 20 and to a proximal end of a base ladder section 260 (i.e., the most proximal of the ladder sections 260). The turntable 262 may be configured to rotate about a vertical axis relative to the chassis 20 to rotate the ladder sections 260 about the vertical axis (e.g., up to 360 degrees, etc.). The ladder sections 260 may rotate relative to the turntable 262 about a substantially horizontal axis to selectively raise and lower the ladder sections 260 relative to the chassis 20. As shown, a water turret or implement, shown as monitor 264, is coupled to a distal end of a fly ladder section 260 (i.e., the most distal of the ladder sections 260). The monitor 264 may be configured to expel water and/or a fire suppressing agent (e.g., foam, etc.) from a water storage tank and/or an agent tank onboard the fire fighting vehicle 250, and/or from an external source (e.g., a fire hydrant, a separate water/pumper truck, etc.). In some embodiments, the ladder assembly 254 further includes an aerial platform coupled to the distal end of the fly ladder section 260 and configured to support one or more operators.

E. ARFF Truck

Figure 11:
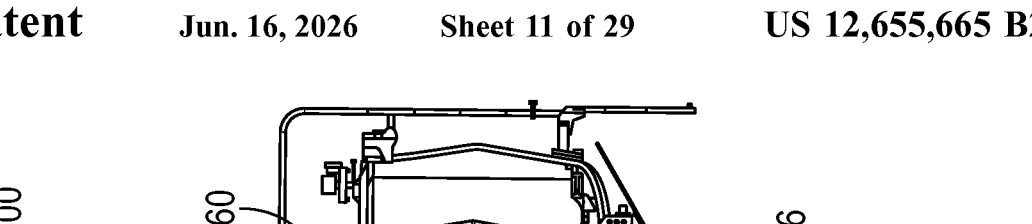
FIG. 11 is a left side view of the vehicle of FIG. 1 configured as an airport fire fighting vehicle, according to an exemplary embodiment.
Figure 11:

Referring now to FIG. 11, the vehicle 10 is configured as a fire fighting vehicle, shown as airport rescue and fire fighting (ARFF) truck 300. As shown in FIG. 11, the application kit 80 is positioned primarily rearward of the cab 40. As shown, the application kit 80 includes a series of storage compartments or cabinets, shown as compartments 302, that are coupled to the chassis 20. The compartments 302 may store various equipment or components of the ARFF truck 300.

The application kit 80 includes a pump system 304 (e.g., an ultra-high-pressure pump system, etc.) positioned within one of the compartments 302 near the center of the ARFF truck 300. The application kit 80 further includes a water tank 310, an agent tank 312, and an implement or water turret, shown as monitor 314. The pump system 304 may include a high pressure pump and/or a low pressure pump, which may be fluidly coupled to the water tank 310 and/or the agent tank 312. The pump system 304 may to pump water and/or fire suppressing agent from the water tank 310 and the agent tank 312, respectively, to the monitor 314. The monitor 314 may be selectively reoriented by an operator to adjust a direction of a stream of water and/or agent. As shown in FIG. 11, the monitor 314 is coupled to a front end of the cab 40.

F. Boom Lift

Figure 12:
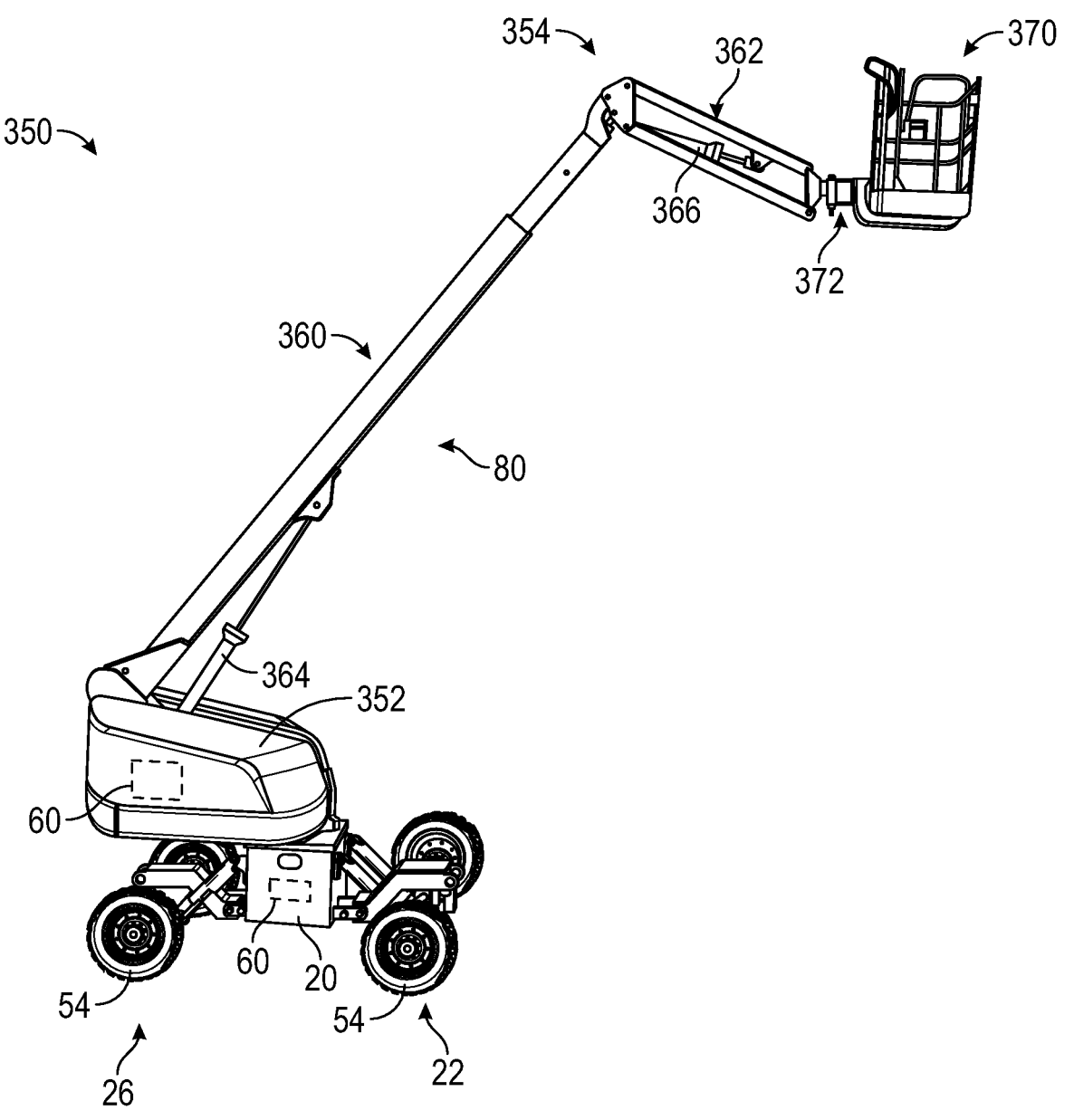
FIG. 12 is a perspective view of the vehicle of FIG. 1 configured as a boom lift, according to an exemplary embodiment.

Referring now to FIG. 12, the vehicle 10 is configured as a lift device, shown as boom lift 350. The boom lift 350 may be configured to support and elevate one or more operators. In other embodiments, the vehicle 10 is configured as another type of lift device that is configured to lift operators and/or material, such as a skid-loader, a telehandler, a scissor lift, a fork lift, a vertical lift, and/or any other type of lift device or machine.

As shown in FIG. 12, the application kit 80 includes a base assembly, shown as turntable 352, that is rotatably coupled to the chassis 20. The turntable 352 may be configured to selectively rotate relative to the chassis 20 about a substantially vertical axis. In some embodiments, the turntable 352 includes a counterweight (e.g., the batteries) positioned near the rear of the turntable 352. The turntable 352 is rotatably coupled to a lift assembly, shown as boom assembly 354. The boom assembly 354 includes a first section or telescoping boom section, shown as lower boom 360. The lower boom 360 includes a series of nested boom sections that extend and retract (e.g., telescope) relative to one another to vary a length of the boom assembly 354. The boom assembly 354 further includes a second boom section or four bar linkage, shown as upper boom 362. The upper boom 362 may includes structural members that rotate relative to one another to raise and lower a distal end of the boom assembly 354. In other embodiments, the boom assembly 354 includes more or fewer boom sections (e.g., one, three, five, etc.) and/or a different arrangement of boom sections.

As shown in FIG. 12, the boom assembly 354 includes a first actuator, shown as lower lift cylinder 364. The lower boom 360 is pivotally coupled (e.g., pinned, etc.) to the turntable 352 at a joint or lower boom pivot point. The lower lift cylinder 364 (e.g., a pneumatic cylinder, an electric linear actuator, a hydraulic cylinder, etc.) is coupled to the turntable 352 at a first end and coupled to the lower boom 360 at a second end. The lower lift cylinder 364 may be configured to raise and lower the lower boom 360 relative to the turntable 352 about the lower boom pivot point.

The boom assembly 354 further includes a second actuator, shown as upper lift cylinder 366. The upper boom 362 is pivotally coupled (e.g., pinned) to the upper end of the lower boom 360 at a joint or upper boom pivot point. The upper lift cylinder 366 (e.g., a pneumatic cylinder, an electric linear actuator, a hydraulic cylinder, etc.) is coupled to the upper boom 362. The upper lift cylinder 366 may be configured to extend and retract to actuate (e.g., lift, rotate, elevate, etc.) the upper boom 362, thereby raising and lowering a distal end of the upper boom 362.

Referring still to FIG. 12, the application kit 80 further includes an operator platform, shown as platform assembly 370, coupled to the distal end of the upper boom 362 by an extension arm, shown as jib arm 372. The jib arm 372 may be configured to pivot the platform assembly 370 about a lateral axis (e.g., to move the platform assembly 370 up and down, etc.) and/or about a vertical axis (e.g., to move the platform assembly 370 left and right, etc.).

The platform assembly 370 provides a platform configured to support one or more operators or users. In some embodiments, the platform assembly 370 may include accessories or tools configured for use by the operators. For example, the platform assembly 370 may include pneumatic tools (e.g., an impact wrench, airbrush, nail gun, ratchet, etc.), plasma cutters, welders, spotlights, etc. In some embodiments, the platform assembly 370 includes a control panel (e.g., a user interface, a removable or detachable control panel, etc.) configured to control operation of the boom lift 350 (e.g., the turntable 352, the boom assembly 354, etc.) from the platform assembly 370 or remotely. In other embodiments, the platform assembly 370 is omitted, and the boom lift 350 includes an accessory and/or tool (e.g., forklift forks, etc.) coupled to the distal end of the boom assembly 354.

G. Scissor Lift

Figure 13:
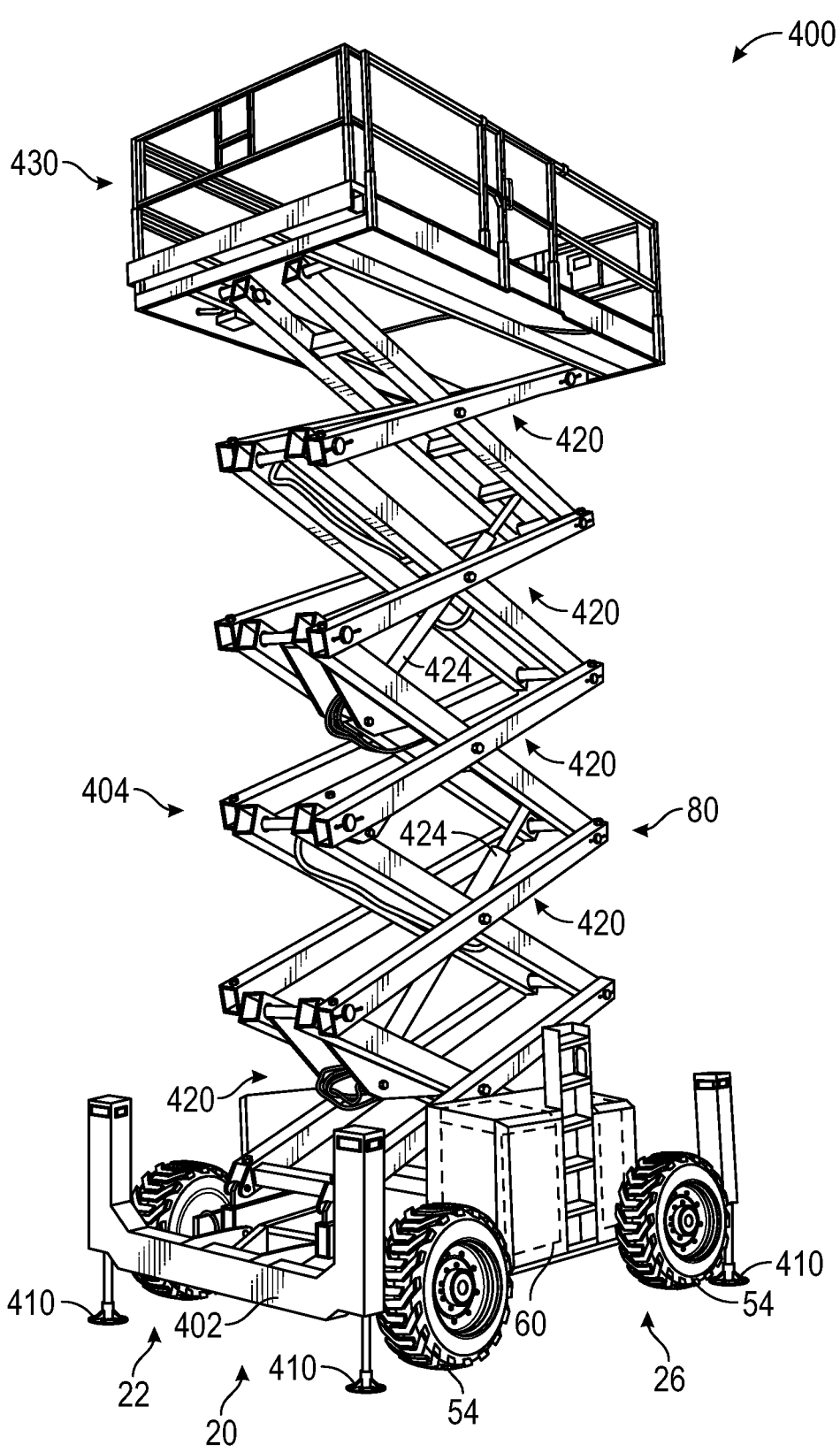
FIG. 13 is a perspective view of the vehicle of FIG. 1 configured as a scissor lift, according to an exemplary embodiment.
Figure 14:
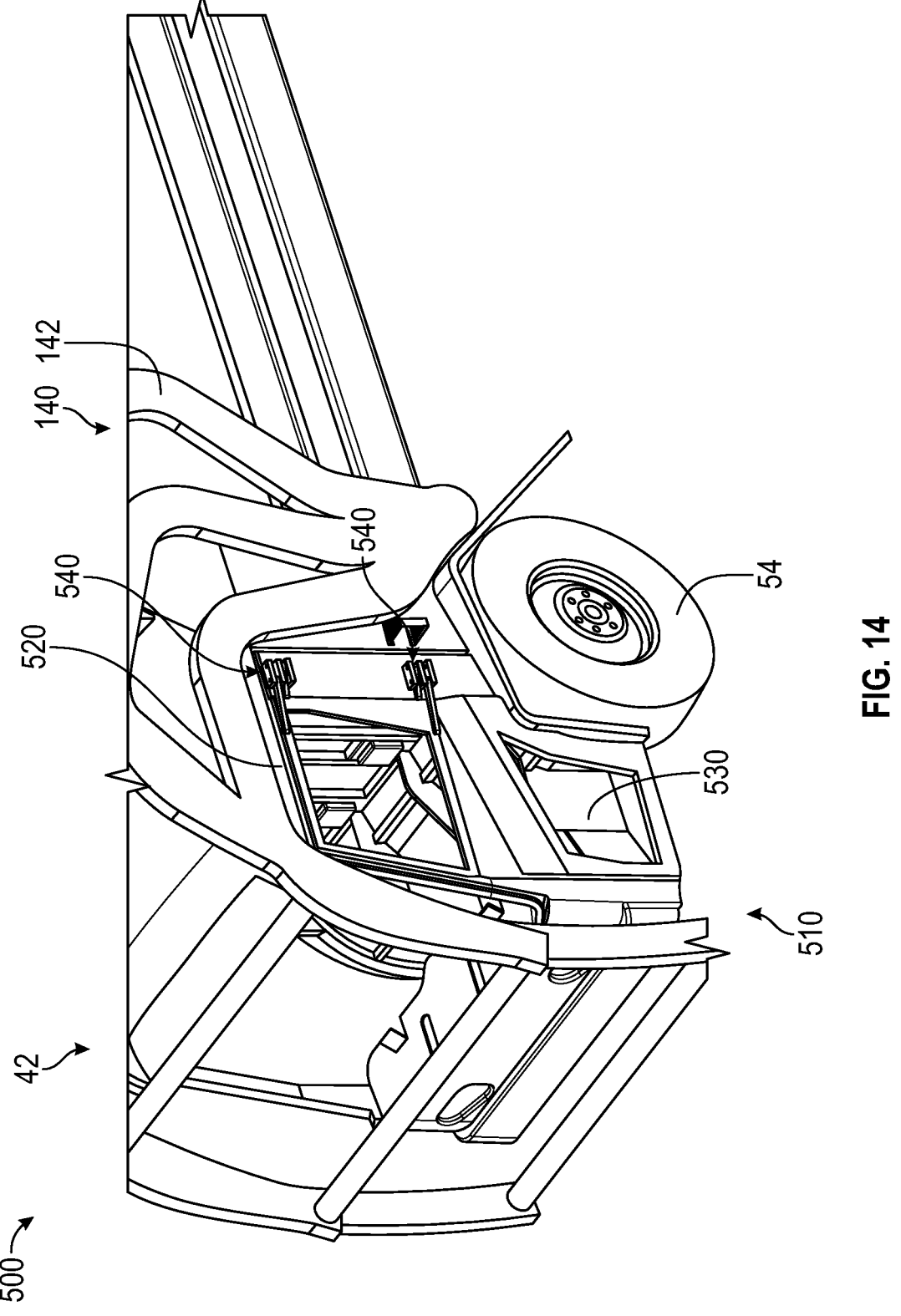
FIG. 14 is a perspective view of the vehicle of FIG. 1, including a stand door, according to an exemplary embodiment.

Referring now to FIG. 13, the vehicle 10 is configured as a lift device, shown as scissor lift 400. As shown in FIG. 13, the application kit 80 includes a body, shown as lift base 402, coupled to the chassis 20. The lift base 402 is coupled to a scissor assembly, shown as lift assembly 404, such that the lift base 402 supports the lift assembly 404. The lift assembly 404 is configured to extend and retract, raising and lowering between a raised position and a lowered position relative to the lift base 402.

As shown in FIG. 13, the lift base 402 includes a series of actuators, stabilizers, downriggers, or outriggers, shown as leveling actuators 410. The leveling actuators 410 may extend and retract vertically between a stored position and a deployed position. In the stored position, the leveling actuators 410 may be raised, such that the leveling actuators 410 do not contact the ground. Conversely, in the deployed position, the leveling actuators 410 may engage the ground to lift the lift base 402. The length of each of the leveling actuators 410 in their respective deployed positions may be varied in order to adjust the pitch (e.g., rotational position about a lateral axis) and the roll (e.g., rotational position about a longitudinal axis) of the lift base 402 and/or the chassis 20. Accordingly, the lengths of the leveling actuators 410 in their respective deployed positions may be adjusted to level the lift base 402 with respect to the direction of gravity (e.g., on uneven, sloped, pitted, etc. terrain). The leveling actuators 410 may lift the wheel and tire assemblies 54 off of the ground to prevent movement of the scissor lift 400 during operation. In other embodiments, the leveling actuators 410 are omitted.

The lift assembly 404 may include a series of subassemblies, shown as scissor layers 420, each including a pair of inner members and a pair of outer members pivotally coupled to one another. The scissor layers 420 may be stacked atop one another in order to form the lift assembly 404, such that movement of one scissor layer 420 causes a similar movement in all of the other scissor layers 420. The scissor layers 420 extend between and couple the lift base 402 and an operator platform (e.g., the platform assembly 430). In some embodiments, scissor layers 420 may be added to, or removed from, the lift assembly 404 in order to increase, or decrease, the fully extended height of the lift assembly 404.

Referring still to FIG. 13, the lift assembly 404 may also include one or more lift actuators 424 (e.g., hydraulic cylinders, pneumatic cylinders, electric linear actuators such as motor-driven leadscrews, etc.) configured to extend and retract the lift assembly 404. The lift actuators 424 may be pivotally coupled to inner members of various scissor layers 420, or otherwise arranged within the lift assembly 404.

A distal or upper end of the lift assembly 404 is coupled to an operator platform, shown as platform assembly 430. The platform assembly 430 may perform similar functions to the platform assembly 370, such as supporting one or more operators, accessories, and/or tools. The platform assembly 430 may include a control panel to control operation of the scissor lift 400. The lift actuators 424 may be configured to actuate the lift assembly 404 to selectively reposition the platform assembly 430 between a lowered position (e.g., where the platform assembly 430 is proximate to the lift base 402) and a raised position (e.g., where the platform assembly 430 is at an elevated height relative to the lift base 402). Specifically, in some embodiments, extension of the lift actuators 424 moves the platform assembly 430 upward (e.g., extending the lift assembly 404), and retraction of the lift actuators 424 moves the platform assembly 430 downward (e.g., retracting the lift assembly 404). In other embodiments, extension of the lift actuators 424 retracts the lift assembly 404, and retraction of the lift actuators 424 extends the lift assembly 404.

Right Hand Stand Door

Referring now to FIGS. 14-17, a vehicle 500 is shown, according to another exemplary embodiment. The vehicle 500 may include one or more doors, shown as door assembly 510. The door assembly 510 may selectively open and close to permit a user access therethrough. The door assembly 510 may be dimensionally similar to standard doors that are coupled to vehicles similar to vehicle 500, such that the door assembly 510 may be replace the standard doors. More specifically, the door assembly 510 may include similar latching dimensions, sealing dimensions, etc. such that the door assembly 510 and the standard door may be interchangeable. The door assembly 510 may be coupled to a side of the cab 42, where the user may access the components within the cab 40 by entering and/or exiting through the door assembly 510. Additionally or alternatively, the door assembly 510 may be provided about the lift assembly 140 to avoid the door assembly 510 from coming in contact with the lift assembly (e.g., lift arm 142, etc.). The door assembly 510 may include one or more door panels, shown as first door panel 520 and second door panel 530. The door panels 520, 530 may be pivotably coupled to one another and further vertically provided in relation to one another. For example, the first door panel 520 may be provided above the second door panel 530. In another example, the second door panel 530 may be provided above the first door panel 520. In yet another example, the door assembly 510 may include an additional panel coupled to a side of the first door panel 520 or the second door panel 530. The door assembly 510 may be configured to pivot between the closed position and the open position to avoid contacting at least one of the tire assembly 54 and the lift assembly 140 (e.g., lift arm 142, etc.). As will be discussed in greater detail herein, the second door panel 530 may be pivotable into a raised position when the door assembly 510 is in the open position.

The door assembly 510 may selectively reposition between at least the closed position and the open position via a linkage assembly 540. The linkage assembly 540 may be positioned proximate the door assembly 510 and distal a front of the vehicle 500. According to an exemplary embodiment, the linkage assembly 540 may be positioned directly adjacent the door assembly 510. The vehicle 500 may include two linkage assemblies 540. The two linkage assemblies 540 may be coupled to the first door panel 520, proximate a respective top and bottom of the first door panel 520. In other embodiments, the linkage assembly 540 may be coupled to the second door panel 530. The linkage assembly 540 may be configured as a pivot location for the door assembly 510, such that the door assembly 510 pivots about at least a portion of the linkage assembly 540 when repositioning between at least the closed position and the open position. As will be discussed in greater detail herein, the linkage assembly 540 may include one or more linkages that are coupled between the door assembly 510 and the linkage assembly 540 to facilitate movement of the door assembly 510.

Figure 15:
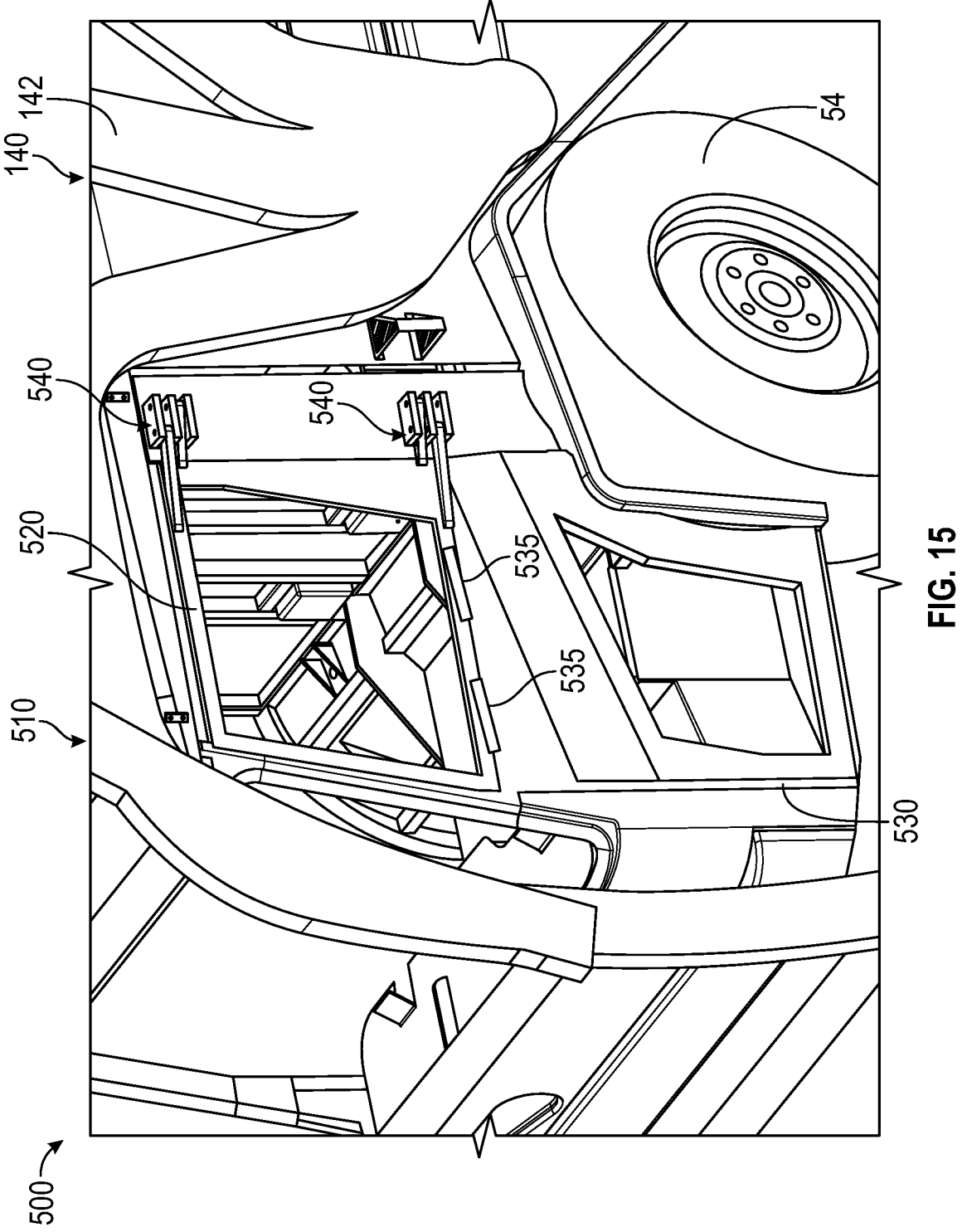
FIG. 15 is a perspective view of the vehicle of FIG. 14, showing the stand door in a closed position, according to an exemplary embodiment.
Figure 16:
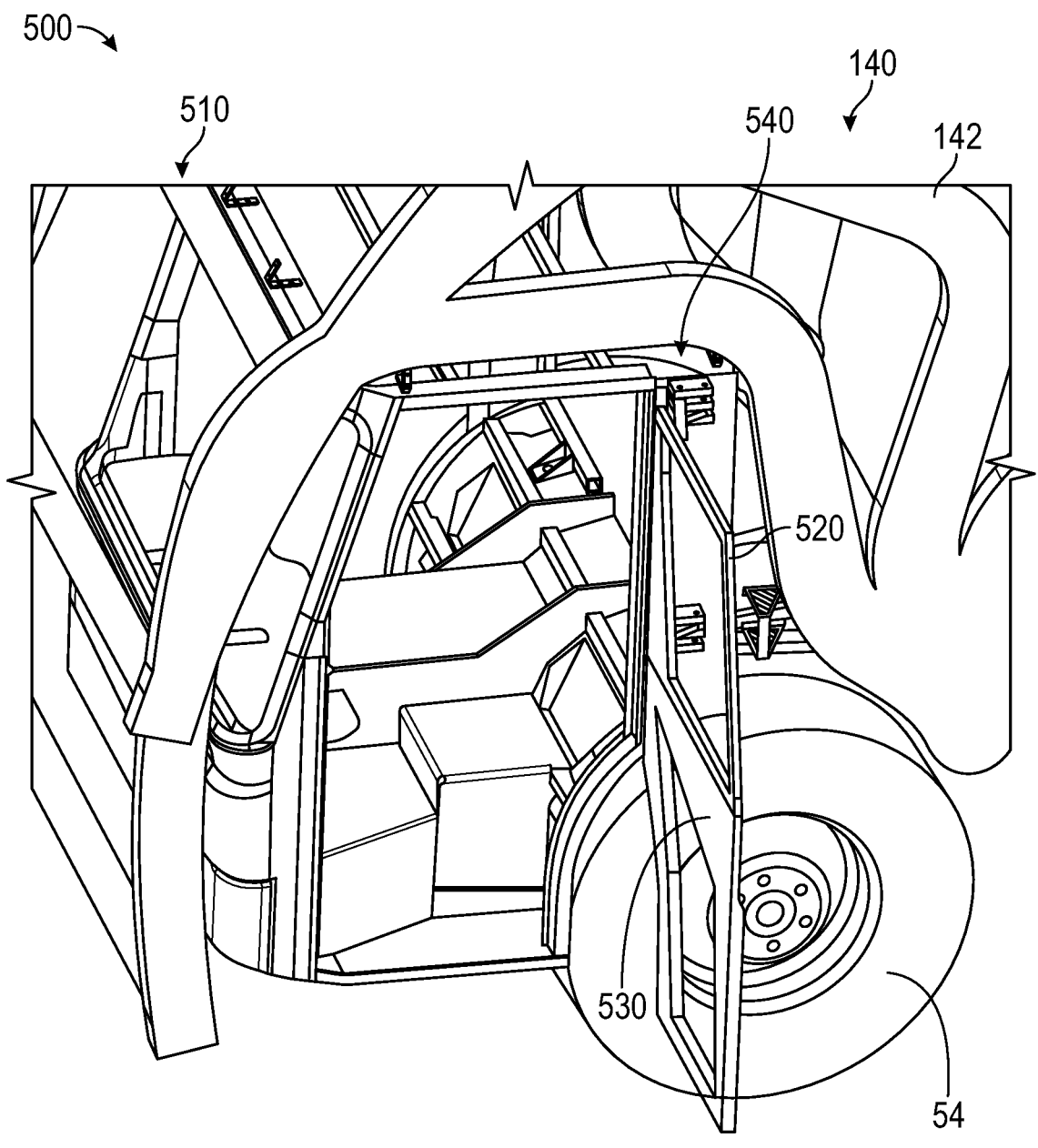
FIG. 16 is a perspective view of the vehicle of FIG. 14, showing the stand door in an intermediate position, according to an exemplary embodiment.
Figure 17:
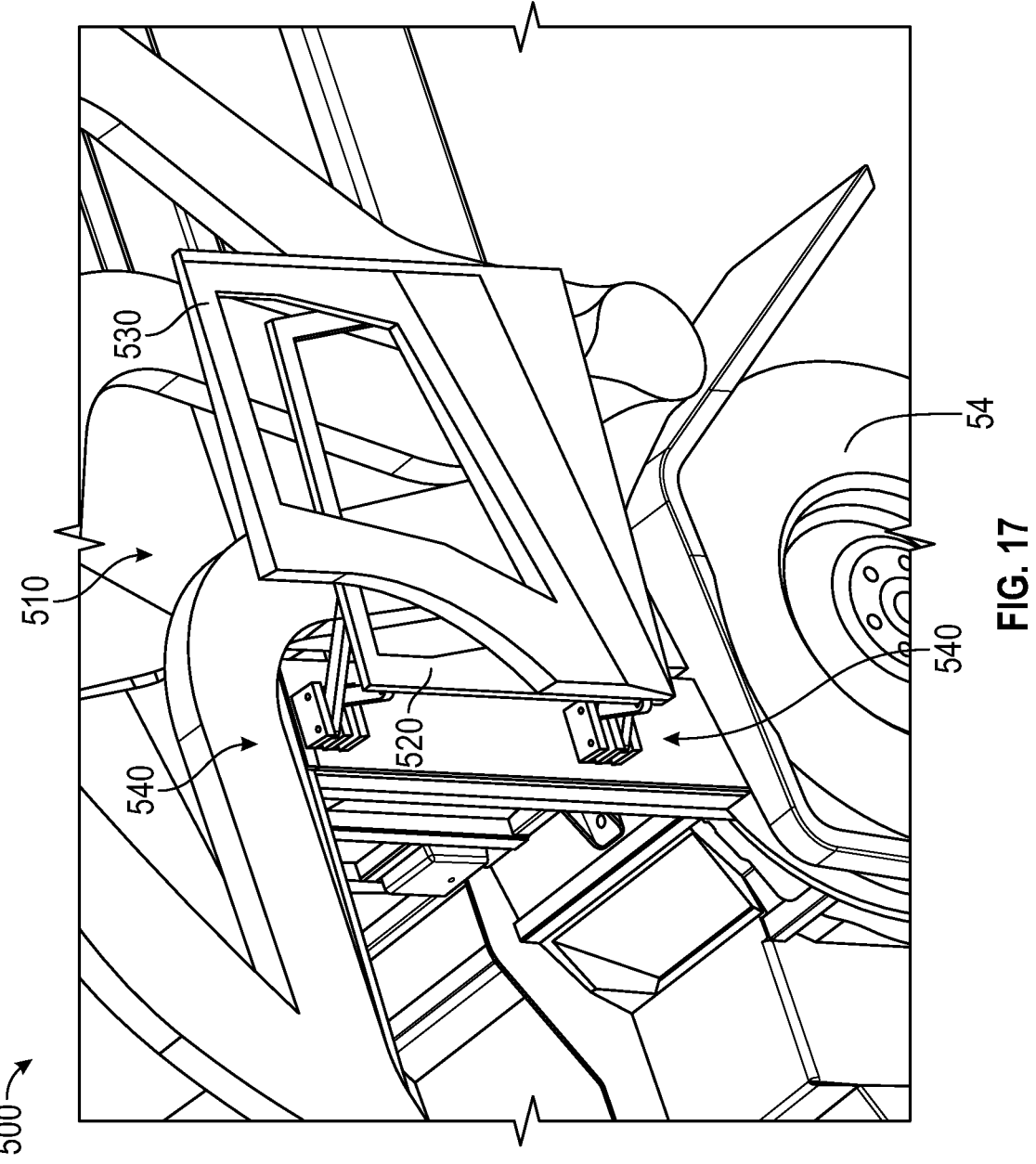
FIG. 17 is a perspective view of the vehicle of FIG. 14, showing the vehicle in an open position, according to an exemplary embodiment.

According to an exemplary embodiment, the door assembly 510 may be selectively repositionable between the closed position (e.g., shown in FIG. 15), one or more intermediate positions (e.g., shown in FIG. 16), and the open position (e.g., shown in FIG. 17). The one or more intermediate positions may be defined as any position where the door assembly 510 is not in the closed position and the open position. When repositioning between the closed position, one or more intermediate positions, and open position, the first door panel 520 may only pivot about the linkage assembly 540, such that the first door panel 520 remains in a substantially vertical orientation. In other embodiments, the first door panel 520 may include multiple pivoting movements other than about the linkage assembly 540 (e.g., about a horizontal axis, etc.) when repositioning between the closed position and the open position. When repositioning between the closed position, one or more intermediate positions, and open position, the second door panel 530 may pivot about the linkage assembly 540 and one or more folding mechanisms, joints, or the like, shown as folding mechanisms 535, such that the second door panel 530 rotates into a substantially horizontal position. As shown in FIG. 15, the folding mechanisms 535 may be coupled to the door assembly 510 between the first door panel 520 and the second door panel 530. Although only two folding mechanisms 535 are depicted, it can be appreciated that any number of folding mechanism(s) 535 may be coupled to the door assembly 510 to facilitate rotation of the second door panel 530. For example, the door assembly 510 may include more than two folding mechanisms 535 when the second door panel 530 has increased loading. The folding mechanism 535 may include an internal locking mechanism that is configured to hold the second door panel 530 into an unfolded position. Additionally or alternatively, the folding mechanism 535 may include an external locking mechanism that is configured to hold the second door panel 530 into a folded position. In other embodiments, the linkage assembly 540 may include a locking mechanism that is configured to hold the door assembly 510 into the open position, where the locking mechanism interfaces with one or more linkages (e.g., linkages 560, 570 in FIGS. 18 and 19).

In some embodiments, the folding mechanism 535 may be an actuating mechanism. In such an embodiment, the folding mechanism 535 may include one or more actuators (e.g., dampers, hydraulics, etc.) to actuate the second door panel 530 into a folded position. The folding mechanism 535 may automatically actuate based upon a position of the door assembly 510. Additionally or alternatively, the folding mechanism 535 may be manually actuated into the folded position based on a user command.

In other embodiments, the folding mechanism 535 may be a spring mechanism. In such an embodiment, the folding mechanism 535 may include one or more coil springs that permit rotational movement of the second door panel 530 into the folded position. The coil springs may include a trigger or stop to prevent the second door panel 530 from prematurely rotating into the folded position.

In yet other embodiments, the folding mechanism 535 may be a manual mechanism. In such an embodiment, the user may manually rotate the second door panel 530 into the folded position to prevent the second door panel 530 from coming in contact with (e.g., crashing, etc.) the tire assembly 54.

Figure 18:
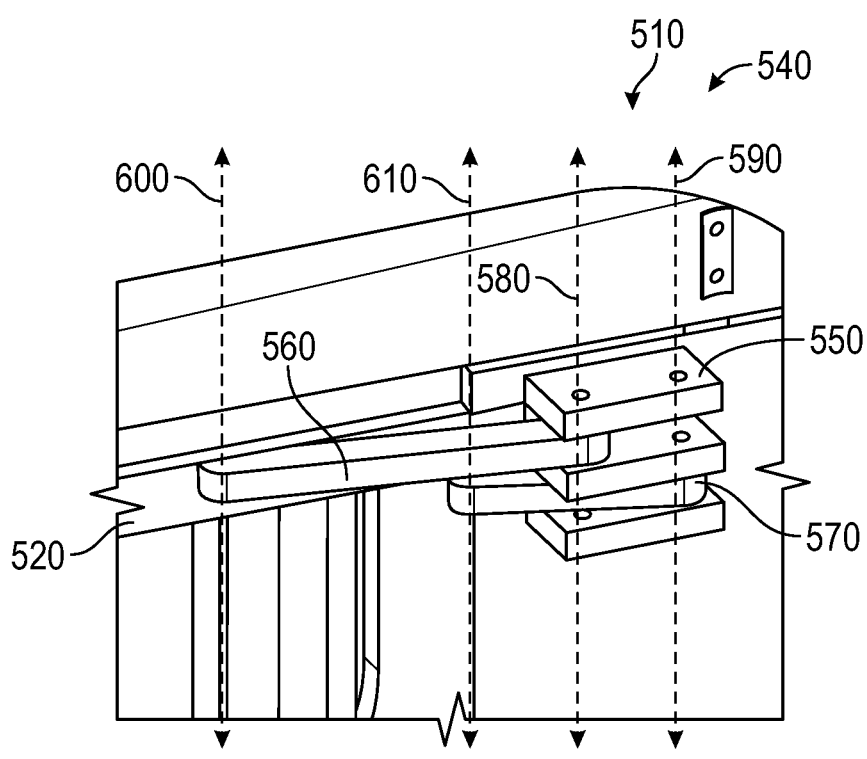
FIG. 18 is a perspective view of a linkage assembly for assembly in the stand door of FIG. 14, shown in a closed position, according to an exemplary embodiment.
Figure 19:
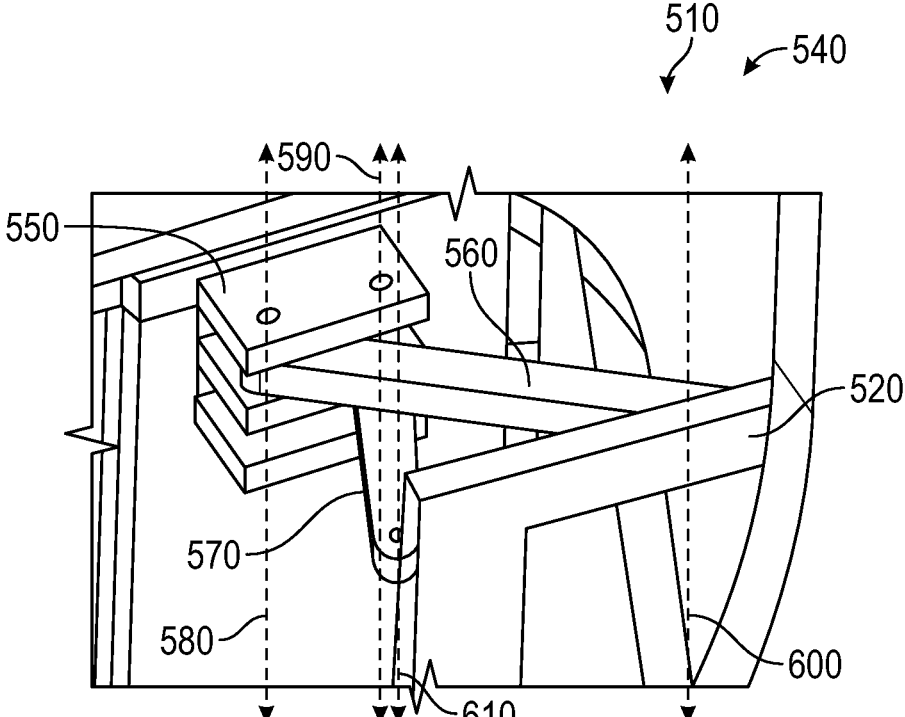
FIG. 19 is a perspective view of the linkage assembly of FIG. 18, shown in an open position, according to an exemplary embodiment.

Referring now to FIGS. 18 and 19, the linkage assembly 540 may include a bracket, holder, etc., shown as linkage bracket 550. The linkage bracket 550 may be fixedly coupled to the cab of the vehicle 500, proximate the door assembly 510. The linkage bracket 550 may be further coupled to one or more linkage arms, shown as first linkage 560 and second linkage 570. The first linkage 560 and the second linkage 570 may be positioned within respective slots vertically provided within the linkage bracket 550. In other embodiments, the linkages 560, 570 may be provided within the same slot of the bracket linkage bracket 550. The linkages 560, 570 may be coupled to the first door panel 520 at different locations. More specifically, the first linkage 560 and the second linkage 570 define respective linkage lengths, where a length of the first linkage 560 is greater than a length of the second linkage 570. In other embodiments, the length of the first linkage 560 may be less than the length of the second linkage 570. As shown in FIG. 18, the linkage assembly 540 is shown when the door assembly 510 is in the closed position. As shown, the linkages 560, 570 may be oriented in substantially the same direction. As shown in FIG. 19, the linkage assembly 540 is shown when the door assembly 510 is in the open position. As shown, the first linkage 560 may be oriented substantially angular to the second linkage 570. Additionally or alternatively, the first linkage 560 may be oriented substantially perpendicular to the second linkage 570 when the door assembly 510 is in the open position. As can be appreciated, the relative orientation of the first linkage 560 and the second linkage 570 continuously changes when the door assembly 510 is repositioned between the closed position and the open position.

Referring still to FIGS. 18 and 19, the linkage assembly 540 defines one or more rotational axes, shown as first axis 580, second axis 590, third axis 600, and fourth axis 610. The axes 580, 590, 600, 610 may be rotational axes for the respective first linkage 560 and the second linkage 570 about the linkage bracket 550 and the first door panel 520. By way of example, the first axis 580 and the third axis 600 may be associated with the first linkage 560, and the second axis 590 and the fourth axis 610 may be associated with the second linkage 570. The linkage bracket 550 may include two sets of apertures extending therethrough, where the linkages 560, 570 may be fastened to the linkage bracket 550 at the apertures. Accordingly, the first axis 580 and the second axis 590 may extend through a respective set of apertures. For example, the first axis 580 may extend through a first set of apertures and the second axis 590 may extend through a second set of apertures. Additionally or alternatively, the third axis 600 may be associated with the first linkage 560 opposite the first axis 580, and the fourth axis 610 may be associated with the second linkage 570 opposite the second axis 590.

The first axis 580 and the second axis 590 may define rotational axes of the linkages 560, 570 about the linkage bracket 550, and the third axis 600 and the fourth axis 610 may define rotational axes of the linkages 560, 570 about the first door panel 520. The second axis 590 can be positioned rearward of the first axis 580. As can be appreciated, repositioning the door assembly 510 simultaneously rotates the linkages 560, 570 about the axes 580, 590, 600, 610. Additionally or alternatively, the axes 580, 590, 600, 610 may be oriented substantially parallel to one another. For example, the axes 580, 590, 600, 610 may be oriented substantially parallel to one another in a vertical configuration. In other embodiments, the axes 580, 590, 600, 610 may not be oriented substantially parallel to one another. In yet other embodiments, the axes 580, 590, 600, 610 may be oriented substantially parallel to one another in a horizontal configuration. In yet other embodiments, the axes 580, 590, 600, 610 may be oriented substantially parallel to one another in an angular configuration. The second linkage 570 may be coupled to the first door panel 520 at an end or edge of the first door panel 520 such that the fourth axis 610 is positioned at an end or edge of the first door panel 520. The first linkage 560 may be coupled to the first door panel 520 forward of the second linkage 570, nearer to a middle of the first door panel 520, such that the third axis 600 is forward of the fourth axis 610.

Figures 20, 21:
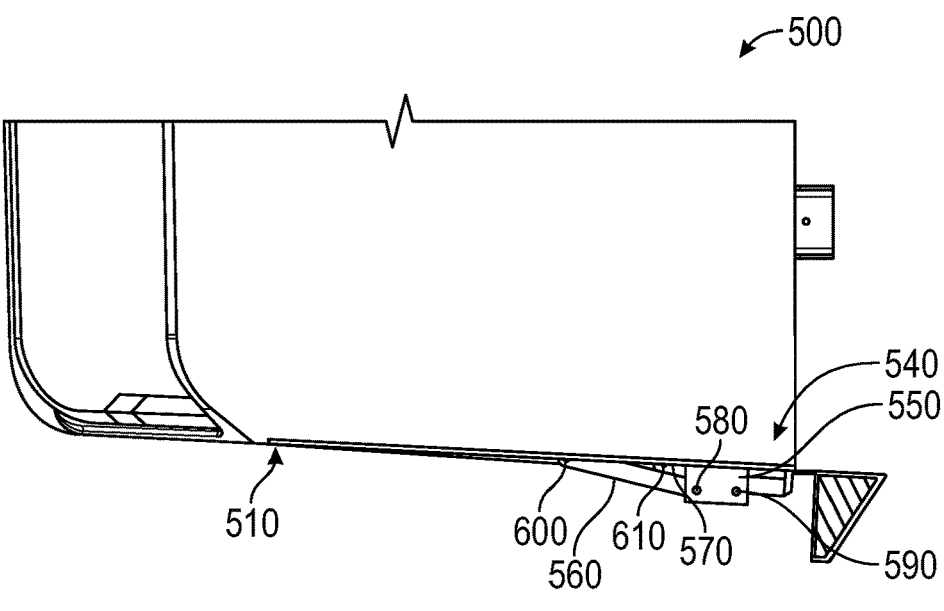
FIG. 20 is a top view of the stand door of FIG. 14, shown in the closed position, according to an exemplary embodiment.
FIG. 21 is another top view of the stand door of FIG. 14, shown in the intermediate position, according to an exemplary embodiment.

Referring now to FIG. 20, the door assembly 510 is shown in the closed position. As shown in FIG. 20, door assembly 510 may be seated flush within the cab 40 when the door assembly 510 is in the closed position. In other embodiments, the door assembly 510 may protrude from the cab 40 when the door assembly 510 is in the closed position.

Referring now to FIG. 21, the door assembly 510 is shown in an intermediate position. As shown in FIG. 21, the door assembly 510 may be selectively repositionable into an intermediate position. The intermediate position shown in FIG. 21 is a position at which the door assembly 510 has been repositioned, and both the first door panel 520 and the second door panel 530 are disposed along the same plane. In such a position, the first linkage 560 and the second linkage 570 may intersect one another. According to an exemplary embodiment, the door assembly 510 may diagonally measure between 50 and 75 inches wide from an end of the door assembly 510 to the cab 40. More specifically, the door assembly 510 may diagonally measure 63 inches wide from the end of the door assembly 510 to the cab 40. When the door assembly 510 is positioned substantially perpendicular to the cab 40, the second door panel 530 may be positioned 0.25 to 1.5 inches away from the tire assembly 54. More specifically, the door assembly 510 may be positioned 0.485 inches away from the tire assembly 54 when the door assembly 510 is positioned substantially perpendicular to the cab 40.

Figure 22:
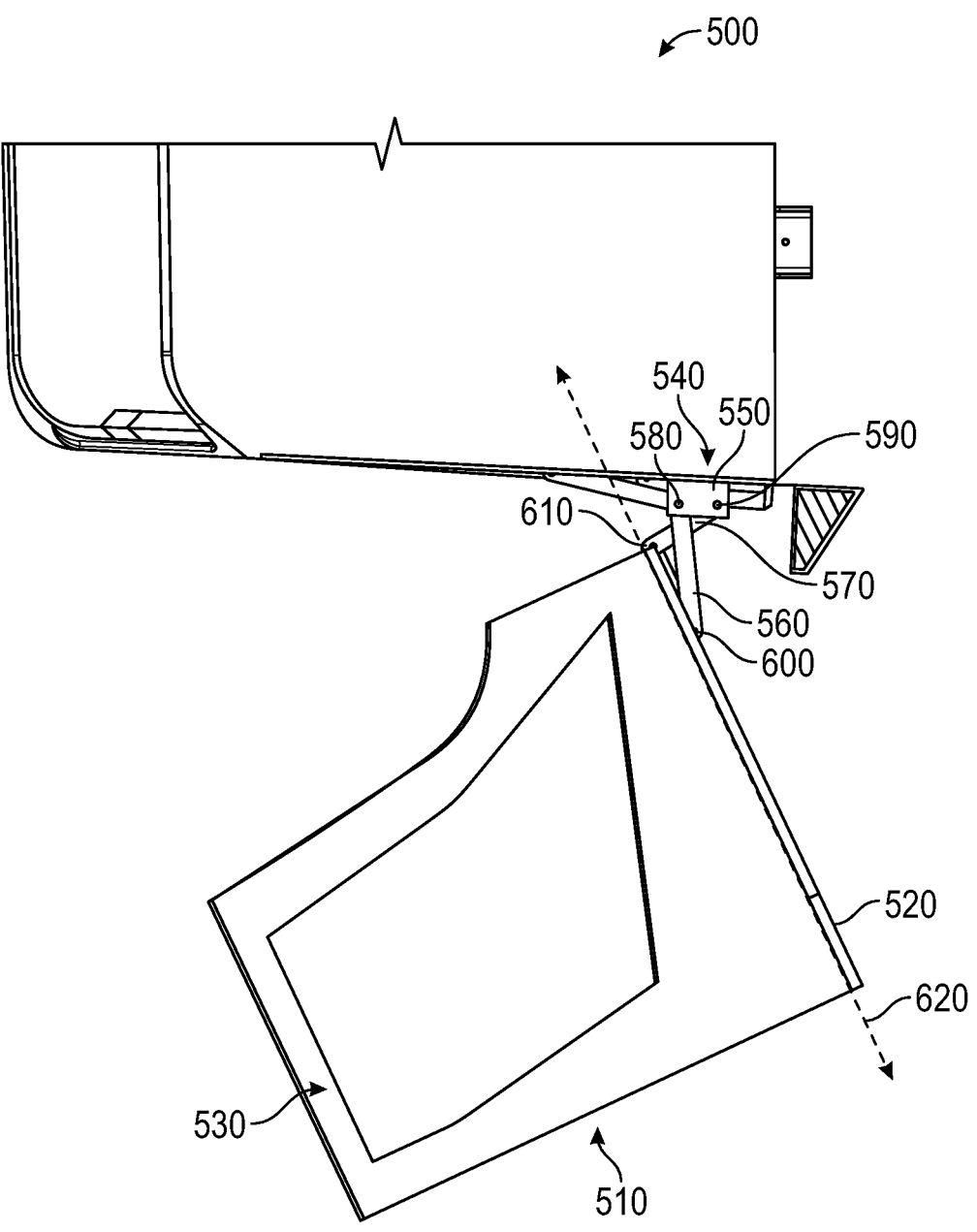
FIG. 22 is another top view of the stand door of FIG. 14, shown in another intermediate position, according to an exemplary embodiment/

Referring now to FIG. 22, the door assembly 510 is shown in another intermediate position. As shown in FIG. 22, the second door panel 530 may pivot about the folding mechanism 535 to reposition the second door panel 530 and orient the door assembly 510 into another intermediate position. As shown, the first door panel 520 and the second door panel 530 are angularly provided to one another, where their respective planes intersect proximate the folding mechanism 535. More specifically, the second door panel 530 may rotate about a rotational axis, shown as fifth axis 620. The fifth axis 620 may be a rotational axis extending through the folding mechanism 535. By way of example, the fifth axis 620 may be oriented substantially perpendicular to the axes 580, 590, 600, 610, where rotation of the second door panel 530 does not crash into the vehicle 500. The second door panel 530 may pivot substantially towards the cab 40 about the fifth axis 620. In other embodiments, the second door panel 530 may pivot substantially away from the cab 40 about the fifth axis 620.

Figure 23:
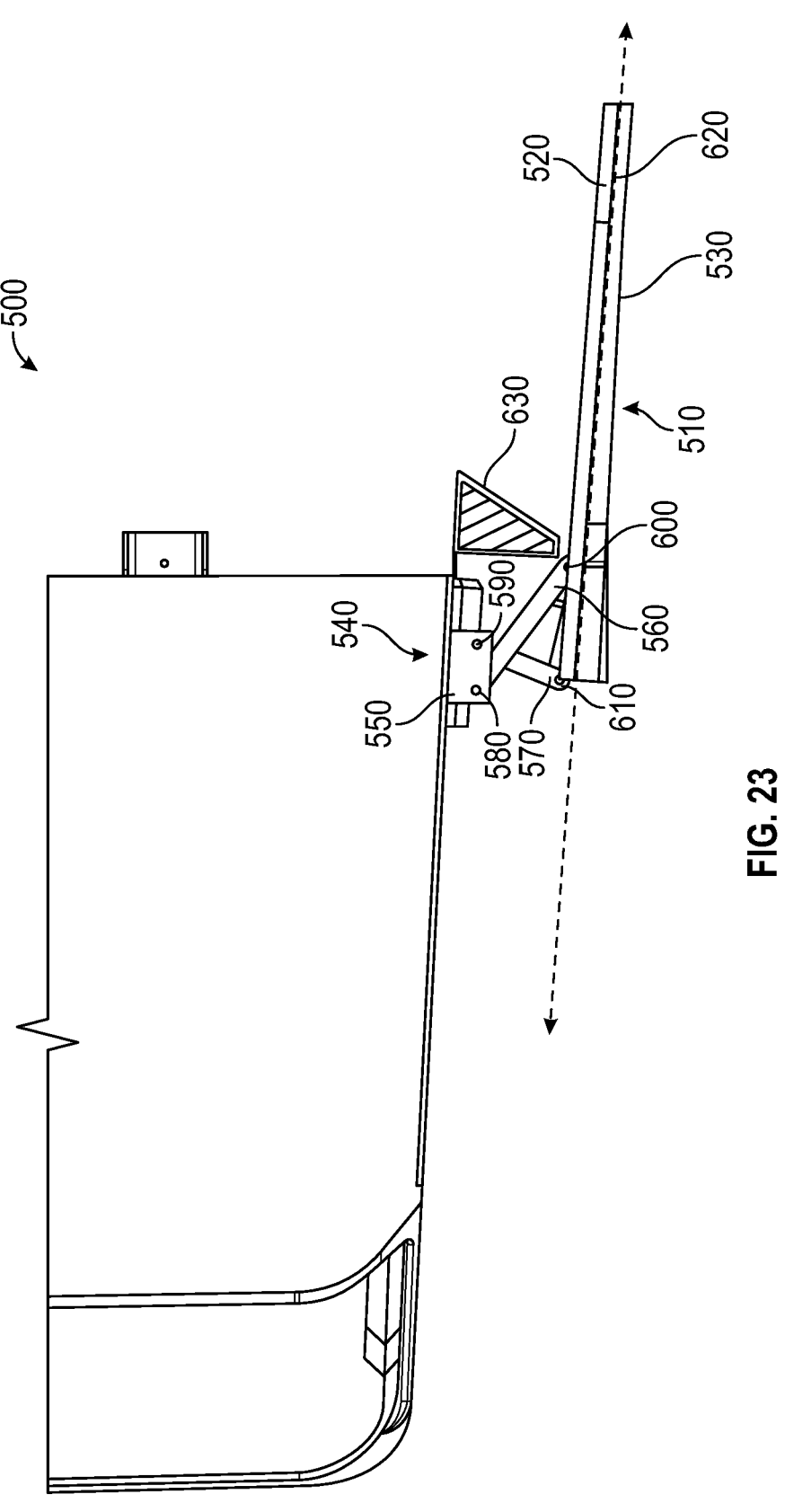
FIG. 23 is another top view of the stand door of FIG. 14, shown in the open position, according to an exemplary embodiment.

Referring now to FIG. 23, the door assembly 510 is shown in an open position. As shown in FIG. 23, the door assembly 510 may be oriented substantially 180 degrees from the closed position and further offset from a seated position. By way of example, the door assembly 510 may be offset the cab 40 and further oriented substantially parallel to the cab 40. According to an exemplary embodiment, the door assembly 510 may be offset the cab 40 at a distance substantially similar to the length of the second linkage 570. In other embodiments, the door assembly 510 may be offset the cab 40 at a distance greater or less than the length of the second linkage 570. Additionally or alternatively, the door assembly 510 may abut a step, stop, detent, protrusion, or the like, shown as step 630. The step 630 may prevent the door assembly 510 from pivoting further and crashing into one of the lift arms 142. By way of example, when the door assembly 510 is in the open position, the door assembly 510 may be positioned outside of the lift arms 142 such to prohibit the door assembly 510 contacting the lift arms 142. As can be appreciated, when the door assembly 510 is in the open position, the overall width may be decreased compared to if the door assembly 510 was positioned perpendicular to the cab 40.

Figure 24:
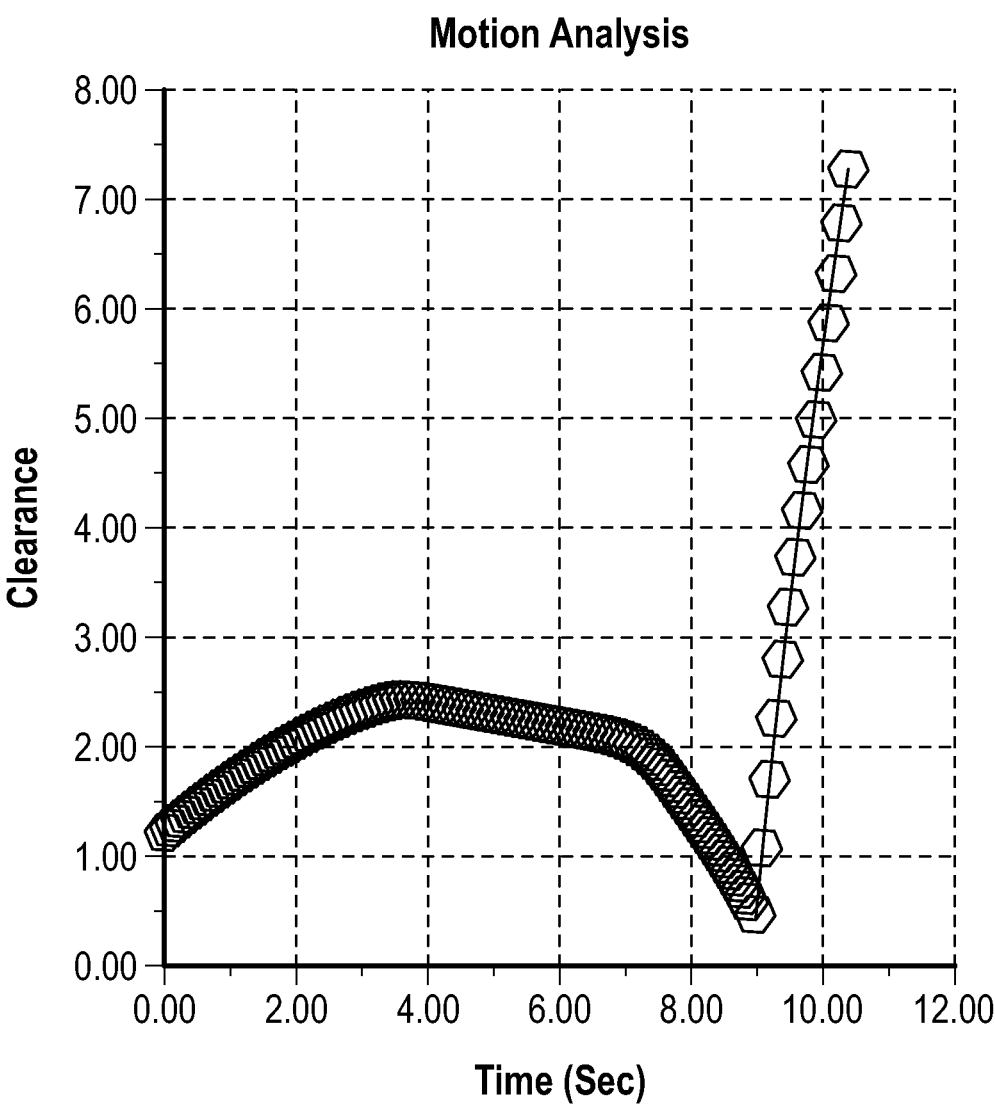
FIG. 24 is a diagram showing the motion analysis of the stand door of FIG. 14, according to an exemplary embodiment.

Referring now to FIG. 24, a motion diagram 700 of the door assembly 510 is shown. As shown in the motion diagram 700, the door assembly 510 may include a clearance of substantially seven inches when the door assembly 510 is in the open position. When the door assembly 510 is in the intermediate position, with the second door panel 530 not folded, the clearance may be less than one inch.

Figure 25:
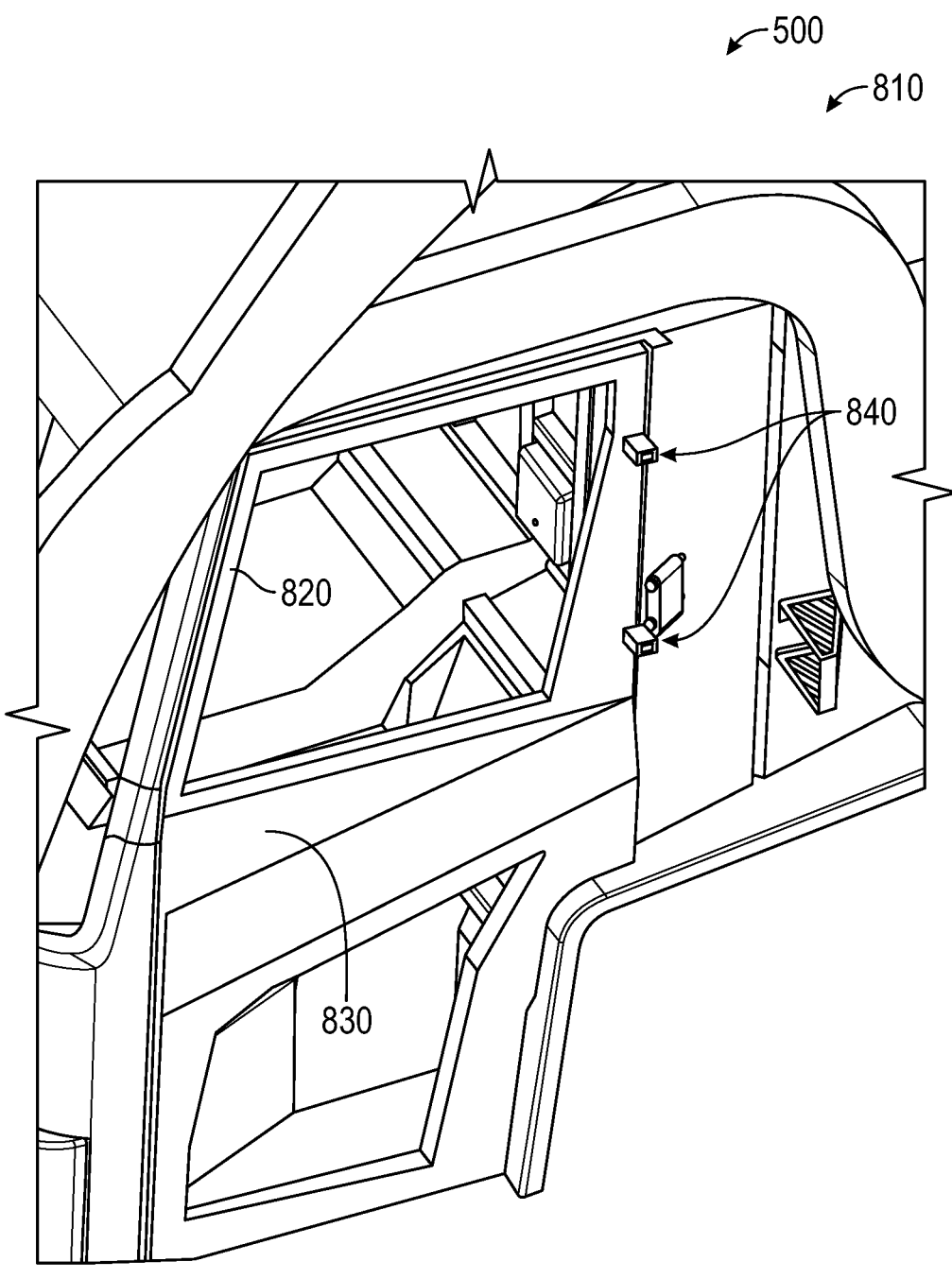
FIG. 25 is a perspective view of a door assembly, shown in a closed position, according to an exemplary embodiment.
Figure 26:
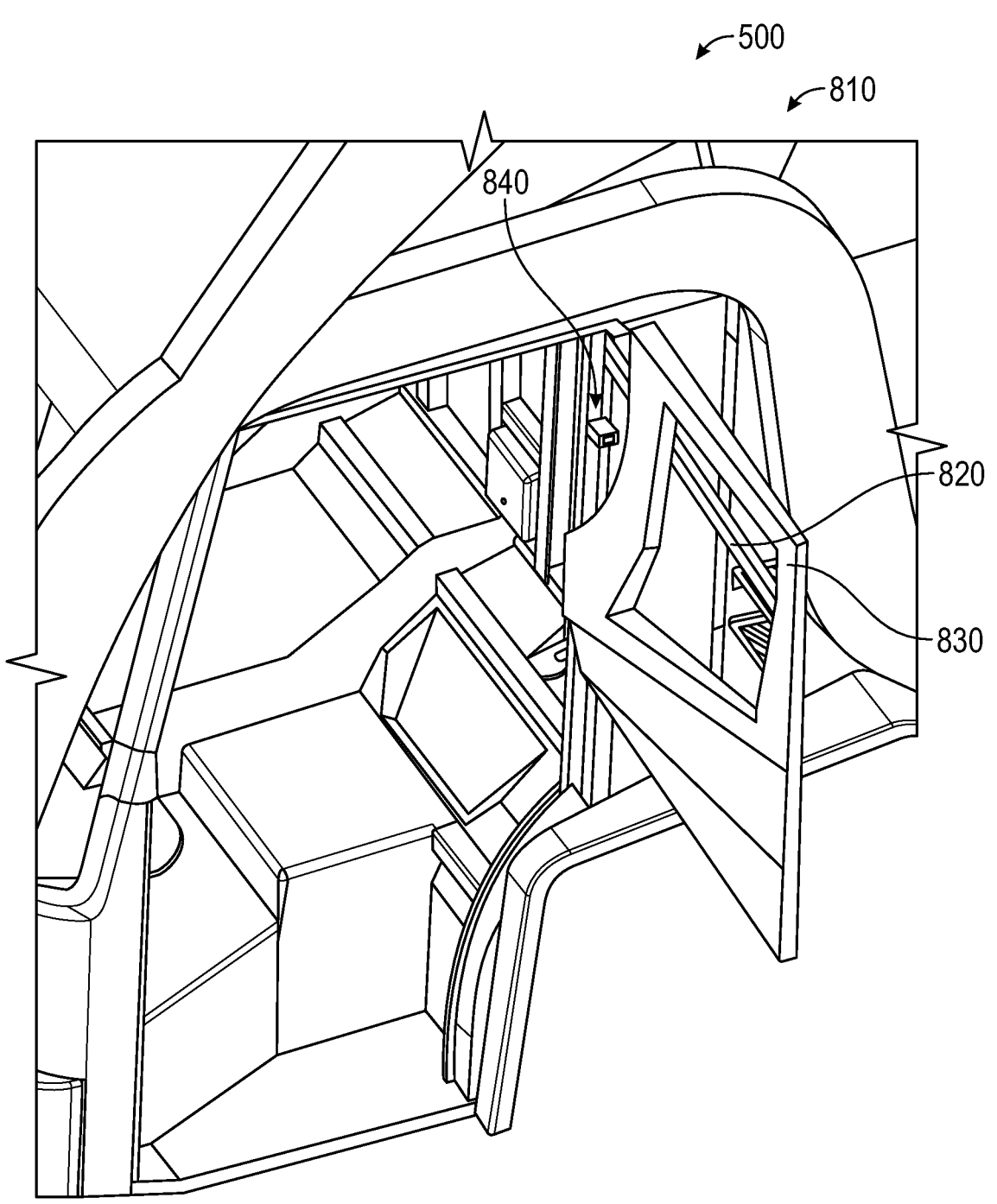
FIG. 26 is a perspective view of the door assembly of FIG. 25, shown in an intermediate position, according to an exemplary embodiment.
Figure 27:
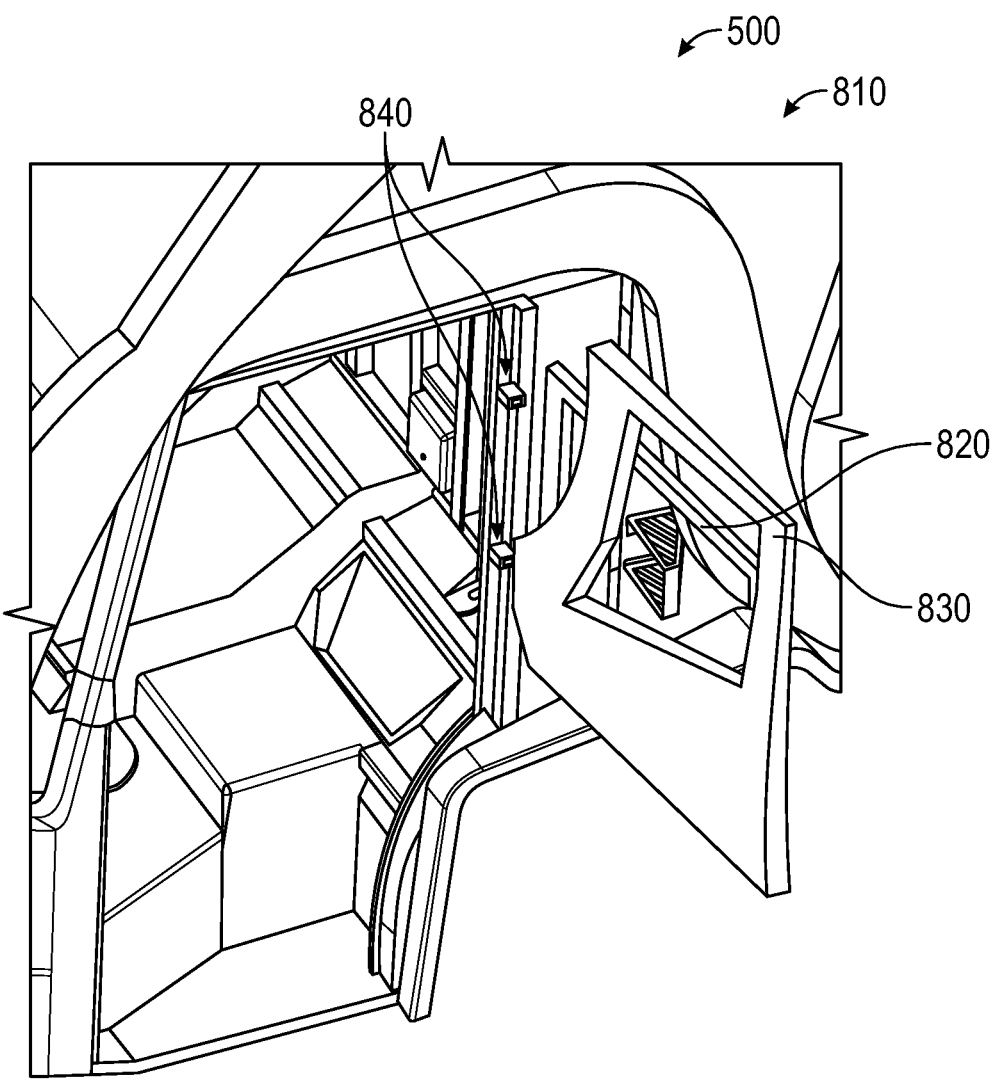
FIG. 27 is a perspective view of the door assembly of FIG. 25, shown in another intermediate position, according to an exemplary embodiment.
Figure 28:
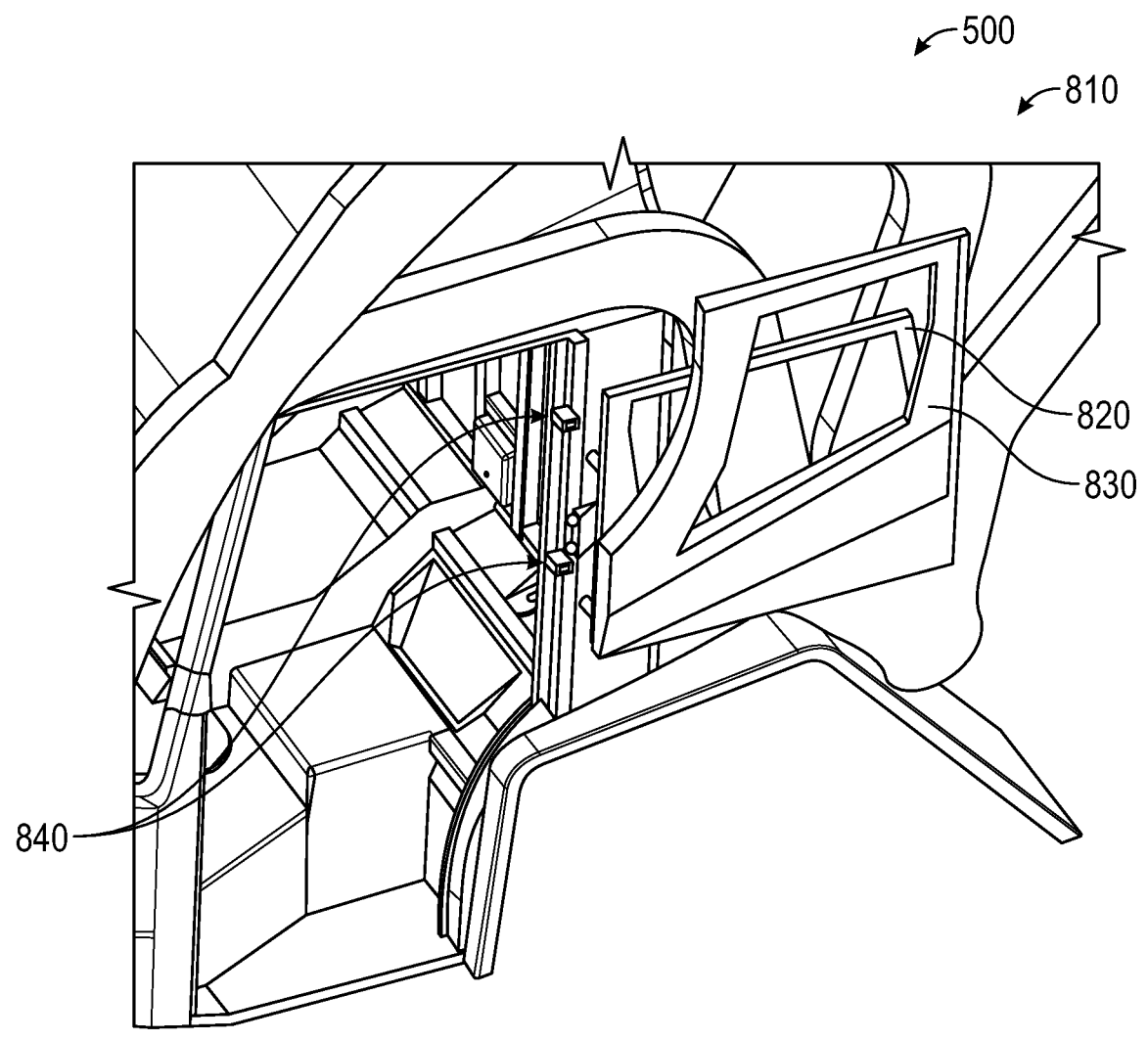
FIG. 28 is a perspective view of the door assembly of FIG. 25, shown in an open position, according to an exemplary embodiment.

Referring generally to FIGS. 25-28, a door assembly 810 is shown, according to an exemplary embodiment. The door assembly 810 may be substantially similar to the door assembly 510 and, as such, like components may be used to describe the door assembly 810 except for the linkage assembly 540. More particularly, the door assembly 810 may include a movement mechanism 840 instead of the linkage assembly 540. The door assembly 810 may repositionable between a closed position, an intermediate position, and an open position to permit or prohibit access to the cab of the vehicle. The door assembly 810 may include a first door panel 820 and a second door panel 830, rotatably coupled to the first door panel 820. As shown in FIG. 25, the door assembly 810 is in the closed position, where the door assembly 810 is positioned flush with the vehicle 500. As shown in FIG. 26, the door assembly 810 is in a first intermediate position, where the door assembly 810 is not seated flush with the vehicle 500 and the second door panel 830 is rotated into an upward position with an end of the second door panel 830 positioned proximate the movement mechanism 840. As shown in FIG. 27, the door assembly 810 is in a second intermediate position, where the door assembly 810 is not seated flush with the vehicle 500 and an end of the second door panel 830 is proximate the movement mechanism 840. As shown in FIG. 28, the door assembly 810 is in the open position.

The movement mechanism 840 may be a sliding hinge mechanism. The movement mechanism 840 may permit rotational movement of the door assembly 810 about a first axis and further permit sliding movement of the door assembly 810 about a second axis. The first axis may be positioned substantially perpendicular relative to the second axis. During operation, the door assembly 810 may first rotate into the first intermediate position, as shown in FIG. 26. Once the door assembly 810 is in the first intermediate position, the door assembly 810 may slide in an outward direction, via the movement mechanism 840, into the second intermediate position, as shown in FIG. 27. Once the door assembly 810 is in the second intermediate position, the door assembly 810 may rotate into the open position via the movement mechanism 840.

Figure 29:
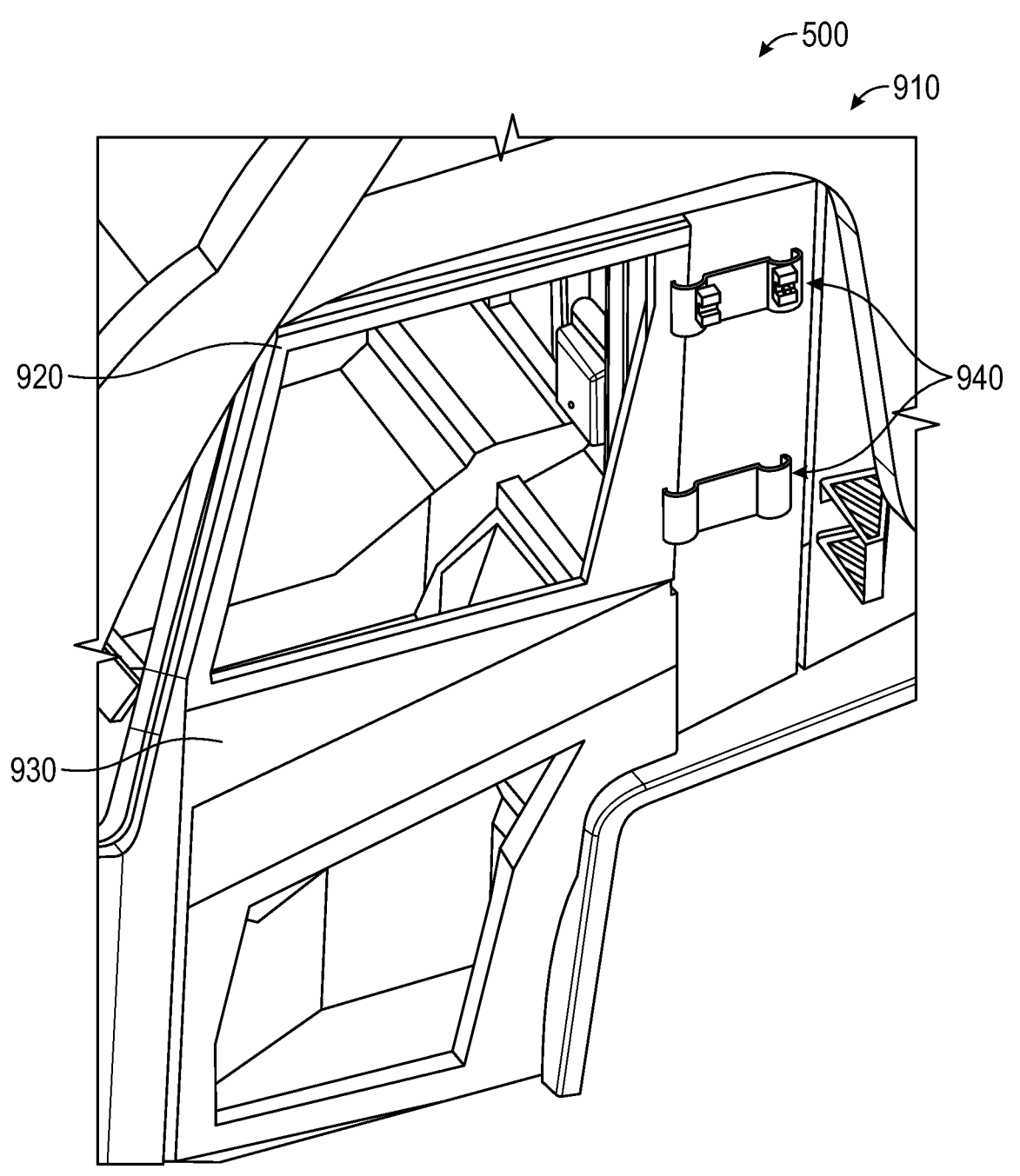
FIG. 29 is a perspective view of a door assembly, shown in an open position, according to an exemplary embodiment.
Figure 30:
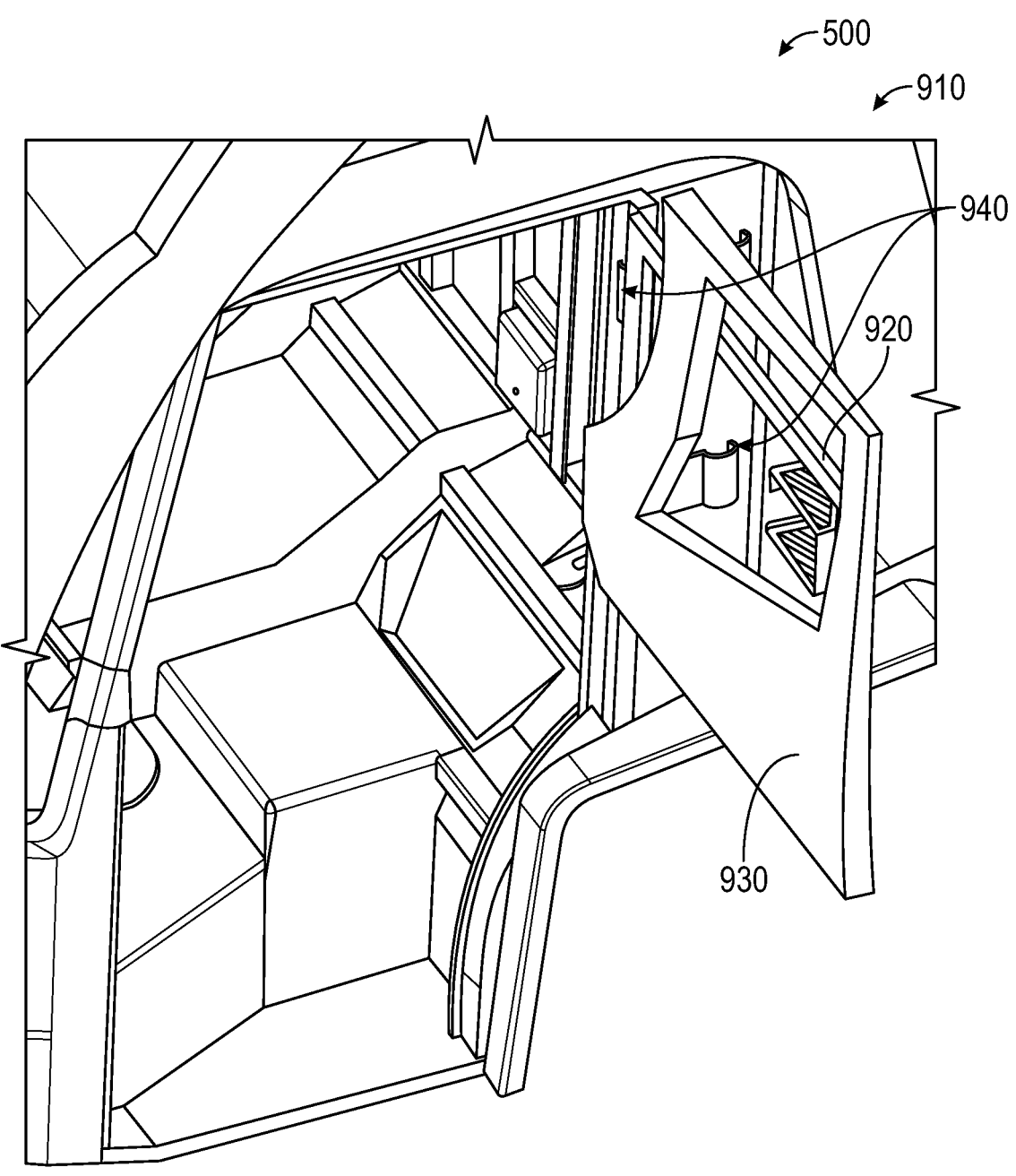
FIG. 30 is a perspective view of the door assembly of FIG. 29, shown in an intermediate position, according to an exemplary embodiment.
Figure 31:
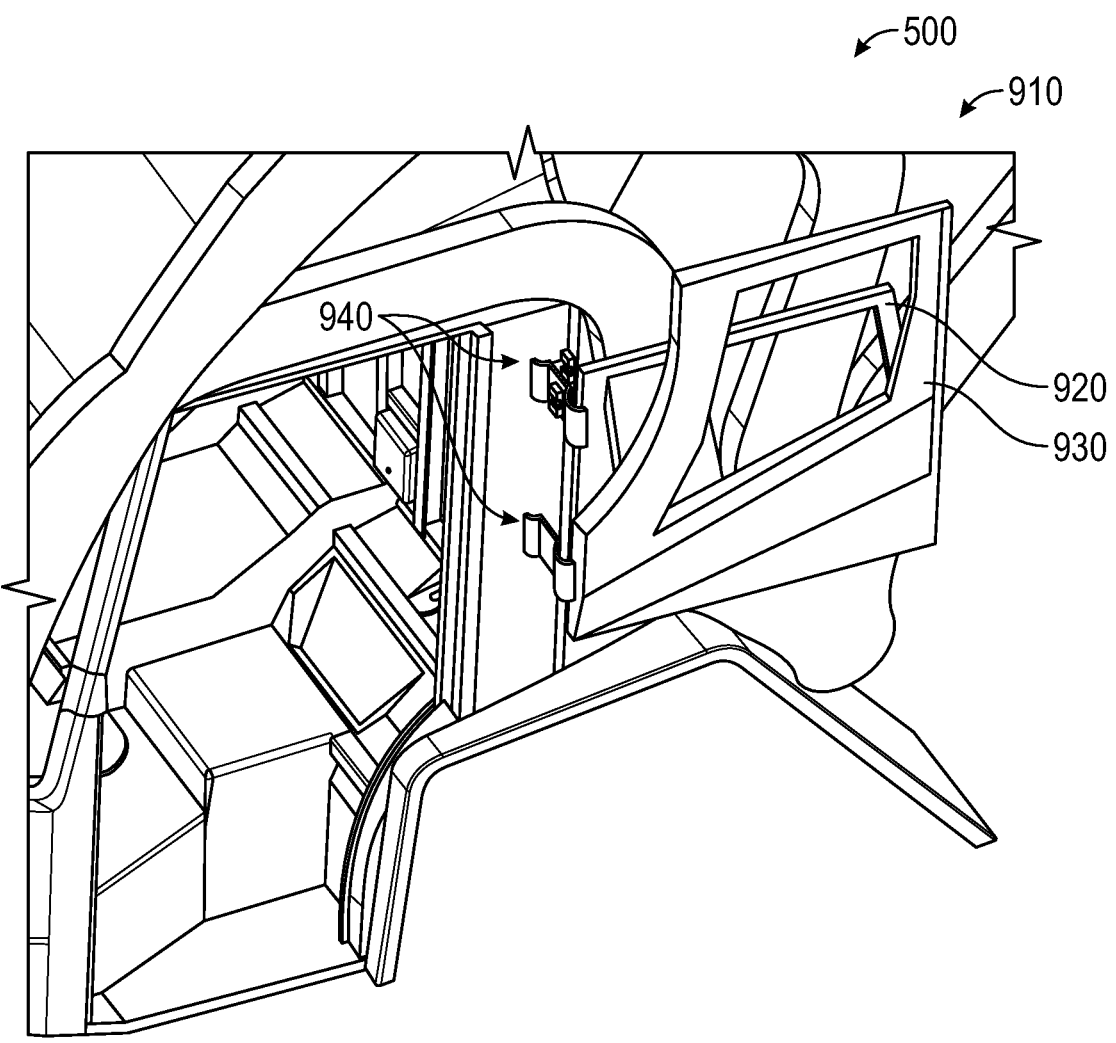
FIG. 31 is a perspective view of the door assembly of FIG. 29, shown in an open position, according to an exemplary embodiment.

Referring generally to FIGS. 29-31, a door assembly 910 is shown, according to an exemplary embodiment. The door assembly 910 may be substantially similar to the door assembly 510 and, as such, like components may be used to describe the door assembly 910 except for the linkage assembly 540. More particularly, the door assembly 910 may include a barrel hinge 940 instead of the linkage assembly 540. The door assembly 910 may repositionable between a closed position, an intermediate position, and an open position to permit or prohibit access to the cab of the vehicle 500. The door assembly 910 may include a first door panel 920 and a second door panel 930, rotatably coupled to the first door panel 920. As shown in FIG. 29, the door assembly 910 is in the closed position, where the door assembly 910 is positioned flush with the vehicle 500. As shown in FIG. 30, the door assembly 910 is in the intermediate position, where the door assembly 910 is not seated flush with the vehicle 500 and the second door panel 930 is rotated into an upward position. As shown in FIG. 31, the door assembly 910 is in the open position.

The barrel hinge 940 may include a first joint having a first rotational axis, and a second joint having a second rotational axis. The first rotational axis may be positioned parallel to the second rotational axis. During operation, the door assembly 910 may rotate about the first rotational axis to position the door assembly 910 into the intermediate position. Once the door assembly 910 is in the intermediate position, the door assembly 910 is then rotated about the second rotational axis to reposition the door assembly 910 into the closed position. When the door assembly 910 is in the closed position, the barrel hinge 940 is also rotated about the second rotational axis such that a plate defined between the first joint and the second joint is rotated distal the vehicle 500.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A refuse vehicle comprising:
   a chassis;
   a body coupled to the chassis and comprising a cab;
   a door assembly coupled to the cab, the door assembly comprising a first door panel and a second door panel, the second door panel rotatably coupled to the first door panel and having an unfolded position and a folded position; and
   a linkage assembly coupling the door assembly to the cab and configured to rotate the door assembly between a closed position and an open position relative to the cab, the linkage assembly comprising:

a first linkage with a first length rotatably coupled to the cab and rotatably coupled to the door assembly; and a second linkage with a second length rotatably coupled to the cab and rotatably coupled to the door assembly, wherein the first length is greater than the second length, wherein in a first state the door assembly is in the closed position the second door panel is in the unfolded position, and in a second state the door assembly is in the open position and the second door panel is in the folded position.

2. The refuse vehicle of claim 1, wherein the linkage assembly is further configured to rotate the door assembly between the closed position, an intermediate position, and the open position, and wherein the second door panel rotates from the unfolded position to the folded position when the door assembly is in the intermediate position.

3. The refuse vehicle of claim 1, wherein the second door panel is rotatably coupled to the first door panel about a first axis, and wherein the door assembly is rotatably coupled to the cab about a second axis, the first axis and the second axis being nonparallel.

4. The refuse vehicle of claim 3, wherein the first axis is substantially perpendicular to the second axis.

5. The refuse vehicle of claim 3, wherein the first axis and the second axis are substantially coplanar.

6. The refuse vehicle of claim 1, wherein the first linkage is rotatable relative to the cab about a third axis and the second linkage is rotatable relative to the cab about a fourth axis, the fourth axis rearward of the third axis.

7. The refuse vehicle of claim 6, wherein the first linkage is rotatable relative to the door assembly around a fifth axis and the second linkage is rotatable relative to the door assembly about a sixth axis, the sixth axis rearward of the fifth axis.

8. The refuse vehicle of claim 7, wherein the sixth axis is proximate an inner edge of the door assembly.

9. The refuse vehicle of claim 1, wherein at least one of the first linkage or the second linkage is positioned above the other of the first linkage or the second linkage.

10. The refuse vehicle of claim 1, wherein the linkage assembly is coupled to the first door panel.

11. The refuse vehicle of claim 10, wherein the second door panel is coupled to the cab via the first door panel.

12. A door comprising:

a door assembly comprising a first door panel and a second door panel, the second door panel rotatably coupled to the first door panel between an unfolded position and a folded position about a first axis; and a bracket rotatably coupled to the door assembly by a linkage assembly, the linkage assembly configured to rotate the door relative to the bracket about a second axis, the linkage assembly comprising:

a first linkage rotatably coupled to the door assembly and the bracket, the first linkage having a first length; and a second linkage rotatably coupled to the door assembly and the bracket, the second linkage having a second length, wherein the first length is greater than the second length.

13. The door of claim 12, wherein the second axis is substantially vertical and wherein the first axis and the second axis are nonparallel.

14. The door of claim 12, wherein the first linkage comprises:

a first pivot point proximate a first end of the first linkage; and a second pivot point proximate a second end of the first linkage, wherein the first linkage is rotatably coupled to the bracket at the first pivot point of the first linkage; and wherein the second linkage comprises:

a first pivot point proximate a first end of the second linkage; and a second pivot point proximate a second end of the second linkage, wherein the second linkage is rotatably coupled to the bracket at the first pivot point of the second linkage.

15. The door of claim 14, wherein the first pivot point of the first linkage rotates about a third axis and the first pivot point of the second linkage rotates about a fourth axis, the third axis being parallel to the fourth axis.

16. The door of claim 15, wherein the third axis is laterally offset a first distance from the fourth axis, the first distance being less than the second length.

17. The door of claim 12, wherein the bracket further comprises a first slot and a second slot vertically offset from the first slot, and wherein the first linkage is positioned within the first slot and the second linkage is positioned within the second slot.

18. A refuse vehicle comprising:

a chassis;

a body coupled to the chassis and comprising a cab;

a door assembly coupled to the cab, the door assembly comprising a first door panel and a second door panel, the second door panel rotatably coupled to the first door panel about a first axis and having an unfolded position and a folded position; and a linkage assembly coupling the door assembly to the cab and configured to rotate the door assembly between a closed position, an intermediate position, and an open position relative to the cab about a second axis, the first axis substantially perpendicular to the second axis, wherein in a first state the door assembly is in the closed position the second door panel is in the unfolded position, and in a second state the door assembly is in the open position and the second door panel is in the folded position, and wherein the second door panel rotates from the unfolded position to the folded position when the door assembly is in the intermediate position.

19. The refuse vehicle of claim 18, wherein the linkage assembly comprises;

a first linkage with a first length rotatably coupled to the cab and rotatably coupled to the door assembly; and a second linkage with a second length rotatably coupled to the cab and rotatably coupled to the door assembly, wherein the first length is greater than the second length, wherein the first linkage is rotatable relative to the cab about a third axis and the second linkage is rotatable relative to the cab about a fourth axis, the fourth axis rearward of the third axis, and wherein the first linkage is rotatable relative to the door assembly around a fifth axis and the second linkage is rotatable relative to the door assembly about a sixth axis, the sixth axis rearward of the fifth axis.

* * * * *